United States Patent
Eguchi

(10) Patent No.: US 10,179,587 B2
(45) Date of Patent: Jan. 15, 2019

(54) DRIVE CONTROL SYSTEM AND DRIVE CONTROL METHOD FOR FRONT- AND REAR-WHEEL DRIVE VEHICLE

(71) Applicant: SUZUKI MOTOR CORPORATION, Hamamatsu-Shi, Shizuoka-Ken (JP)

(72) Inventor: Teppei Eguchi, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 99 days.

(21) Appl. No.: 15/336,159

(22) Filed: Oct. 27, 2016

(65) Prior Publication Data

US 2017/0129495 A1    May 11, 2017

(30) Foreign Application Priority Data

Nov. 5, 2015    (JP) .................. 2015-217242

(51) Int. Cl.
| | |
|---|---|
| B60W 30/18 | (2012.01) |
| B60W 20/13 | (2016.01) |
| B60W 10/06 | (2006.01) |
| B60W 10/08 | (2006.01) |
| B60W 30/045 | (2012.01) |

(52) U.S. Cl.
CPC ...... B60W 30/18145 (2013.01); B60W 10/06 (2013.01); B60W 10/08 (2013.01); B60W 20/13 (2016.01); B60W 30/045 (2013.01); B60W 2300/36 (2013.01); B60W 2300/365 (2013.01); B60W 2510/244 (2013.01); B60W 2520/18 (2013.01); B60W 2540/10 (2013.01); B60W 2710/0666 (2013.01); B60W 2710/083 (2013.01); B60W 2720/403 (2013.01); B60Y 2200/92 (2013.01); B60Y 2300/045 (2013.01); B60Y 2300/1815 (2013.01); Y02T 10/7258 (2013.01); Y10S 903/93 (2013.01)

(58) Field of Classification Search
CPC .......... B60W 30/18145; B60W 10/08; B60W 30/045; B60W 10/06; B60W 20/13; B60W 2720/403; B60W 2520/18; B60W 2300/36; B60W 2510/244; B60W 2540/10; B60W 2710/0666; B60W 2710/083; B60W 2300/365; Y10S 903/93; B60Y 2300/1815; B60Y 2200/92; B60Y 2300/045; Y02T 10/7258
USPC ....................................................... 701/22
See application file for complete search history.

(56) References Cited

FOREIGN PATENT DOCUMENTS

JP          H0516872 A        1/1993

*Primary Examiner* — Brian P Sweeney
(74) *Attorney, Agent, or Firm* — Barnes & Thornburg LLP

(57) ABSTRACT

A drive control system for a front- and rear-wheel drive vehicle is provided. The drive control system is installed on the front- and rear-wheel drive vehicle, which is a two-wheeler equipped with a front wheel and a rear wheel both serving as driving wheels, one of which is a steered wheel. When the vehicle is banking, the drive control system performs control of decreasing target driving torque of the steered wheel according to an amount of accelerator operation during acceleration operation of a driver compared to when the vehicle is running upright.

16 Claims, 16 Drawing Sheets

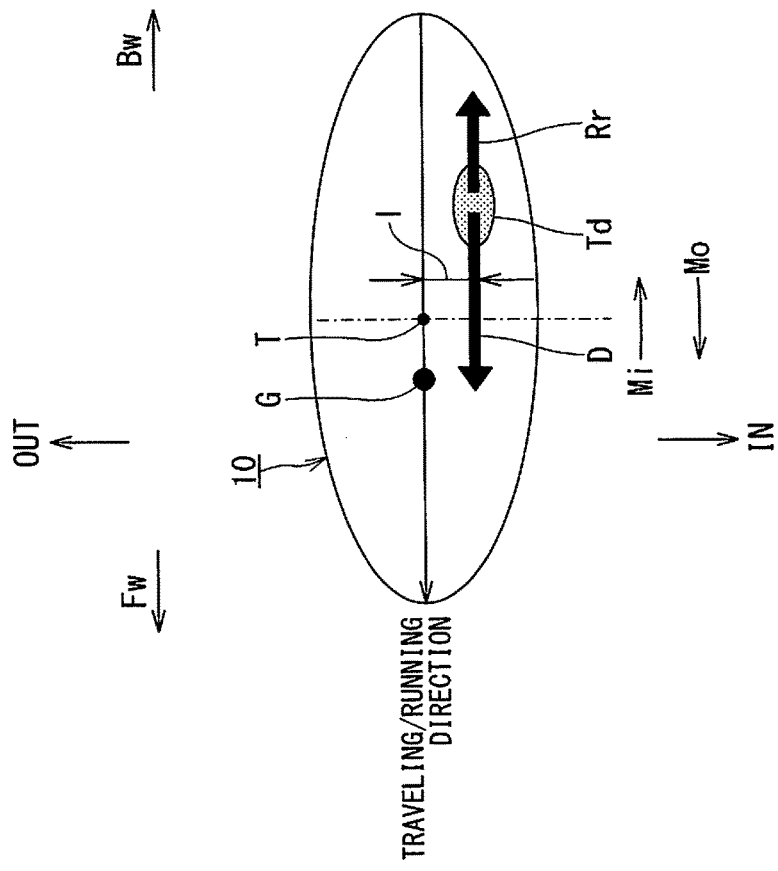
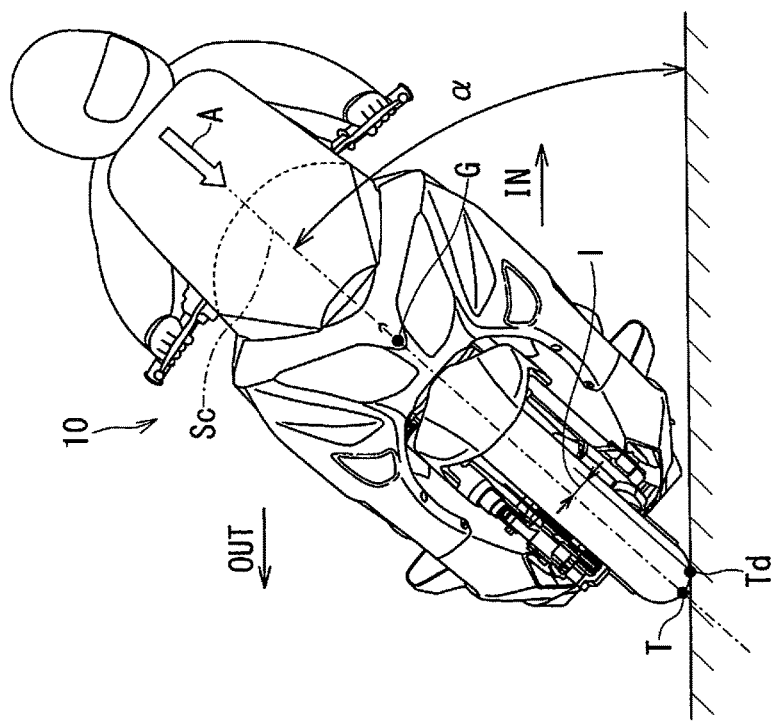
FIG. 13A
FIG. 13B

DRIVE CONTROL SYSTEM AND DRIVE CONTROL METHOD FOR FRONT- AND REAR-WHEEL DRIVE VEHICLE

CROSS-REFERENCE TO RELATED APPLICATIONS

This application claims the benefit of priority of Japanese Patent Application No. 2015-217242, filed Nov. 5, 2015, the entire contents of which are incorporated herein by reference.

BACKGROUND OF THE INVENTION

Field of the Invention

The present invention relates to a drive control technique for a front- and rear-wheel drive vehicle which gives a sufficient driving force while improving turning performance of the vehicle and enables smooth driving.

Description of the Related Art

Patent Document 1 (Japanese Patent Laid-Open No. H05-16872) describes a front- and rear-wheel drive two-wheeler in which a drive source of a rear wheel and a motor driving source of a front wheel are drive-controlled individually and a motor is mounted on a steering system. With this front- and rear-wheel drive two-wheeler, influence of a front wheel on steering is lessened by mounting the motor on the steering system.

However, with the front- and rear-wheel drive two-wheeler according to Patent Document 1, when a vehicle body tilts (hereinafter "banks") to either right or left during turning of the vehicle, a tire-to-ground contact point moves inward of a steering axis center in a turning direction, and consequently when a driver opens an accelerator (accelerate the vehicle), increases in driving force of the motor may sometimes affect aligning torque of the steering system.

With a normal rear-wheel drive vehicle, the tire-to-ground contact point moves inward of the steering axis center in the turning direction during turning of the vehicle, and consequently moment is generated around a center of a rotation axis for steering by running resistance acting on a tire tread and the moment acts to steer the vehicle inward (in the turning direction). In this case, even when the driver gradually opens the accelerator from OFF, a direction of force applied to a front wheel does not change.

With a front- and rear-wheel drive two-wheeler such as described in Patent Document 1, when the driver opens the accelerator to give driving force to the front wheel and the driving force overcomes the running resistance, the moment around the center of the rotation axis for steering acts in an opposite direction, acting to steer the vehicle outward (in a direction opposite the turning direction). Consequently, a direction and magnitude of a steering force required for handling changes, which may give the driver a sense of discomfort.

SUMMARY OF THE INVENTION

The present invention has been made in light of the above circumstances, and accordingly it is an object of the present invention to provide a drive control technique for a front- and rear-wheel drive vehicle which enables smooth and stable driving by reducing influence of driving force applied to a steered wheel on steering.

To solve the above problem, a drive control system according to an aspect of the present invention is a drive control system for a front- and rear-wheel drive vehicle. The drive control system is installed on the front- and rear-wheel drive vehicle, which is a two-wheeler equipped with a front wheel and a rear wheel both serving as driving wheels, one of which is a steered wheel. When the vehicle is banking, the drive control system performs control of decreasing target driving torque of the steered wheel according to an amount of accelerator operation during acceleration operation of a driver compared to when the vehicle is running upright.

According to the present invention, compared to when a front- and rear-wheel drive vehicle is running upright, when the vehicle is banking, influence of changes in driving force applied to a steered wheel on steering behavior is lessened by decreasing target driving torque of a steering wheel resulting from an acceleration operation of a driver. This improves stability of a vehicle body.

The nature and further characteristic features of the present invention will be described hereinafter in the following descriptions made with reference to the accompanying drawings, and the other advantages effects and functions of the present invention will be also made clear hereinafter.

BRIEF DESCRIPTION OF THE DRAWINGS

FIG. 13A is a front view of the front- and rear-wheel drive vehicle during cornering as viewed from the front;

FIG. 13B is a diagram showing how forces act during turning of a front tire when the front- and rear-wheel drive vehicle is photographed from a direction of A in FIG. 13A;

DETAILED DESCRIPTION

Figure 1:
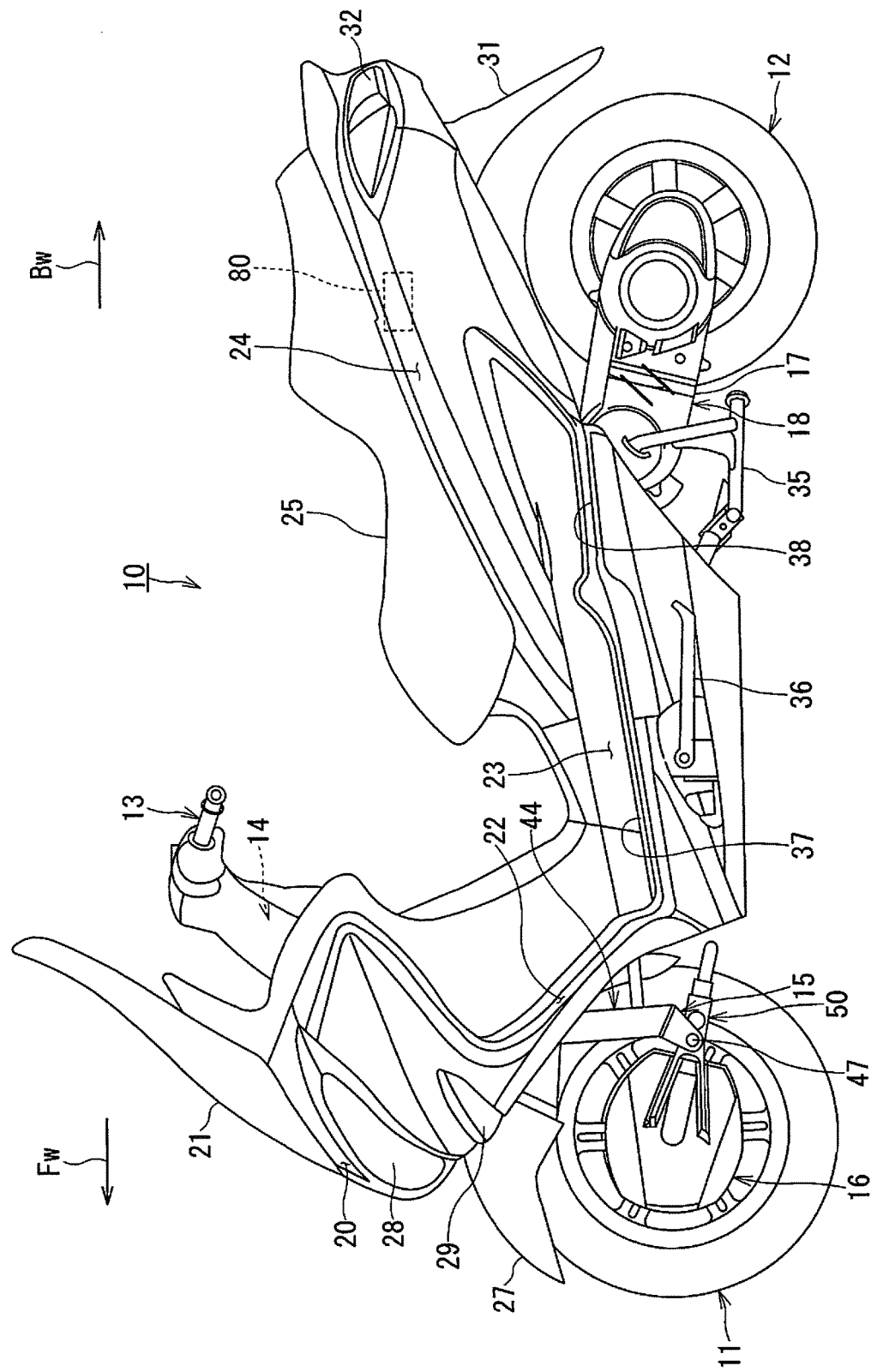
FIG. 1 is a left side view showing an overall external shape of a front- and rear-wheel drive vehicle according to an embodiment of the present invention.
Figure 2:
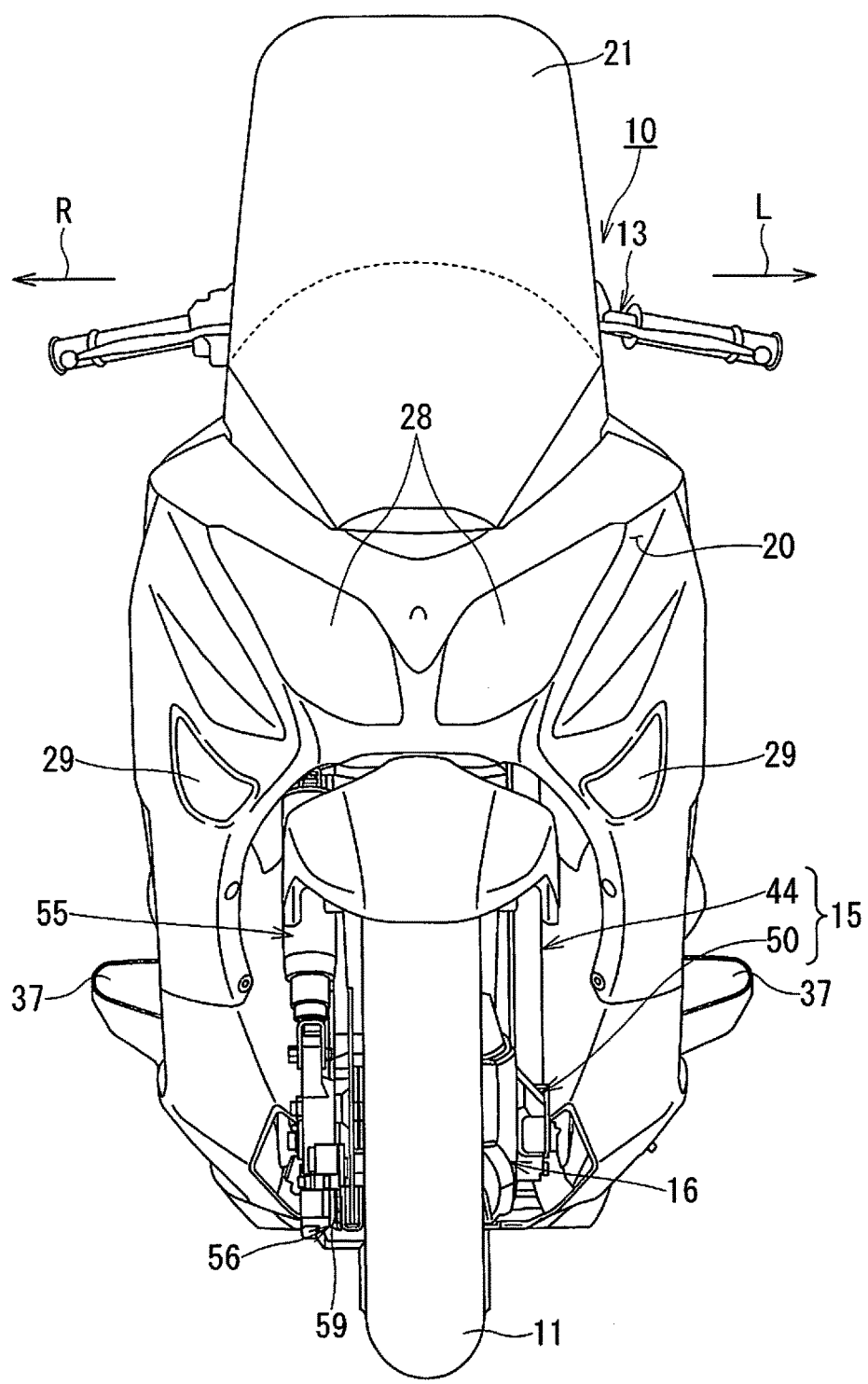
FIG. 2 is a front view of the front- and rear-wheel drive vehicle shown in FIG. 1 as viewed from the front of the vehicle.
Figure 3:
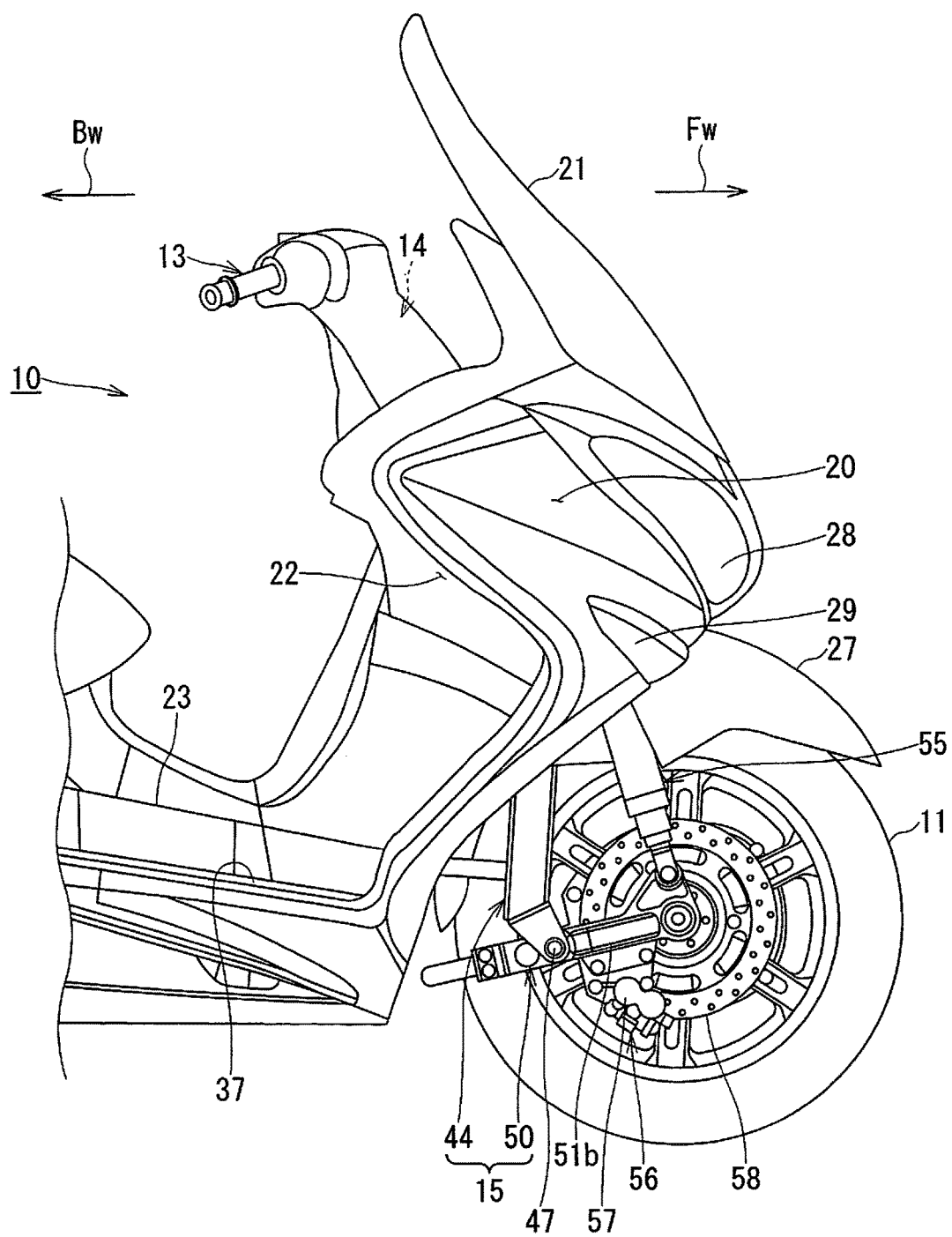
FIG. 3 is a right side view showing a front half of the front- and rear-wheel drive vehicle shown in FIG. 1.

Hereinbelow, a description will be given of a drive control system and a drive control method for front- and rear-wheel drive vehicle according to embodiments of the present invention with reference to the drawings. FIG. 1 is a left side view of a front- and rear-wheel drive vehicle according to an embodiment of the present invention, showing an external shape of the entire vehicle; FIG. 2 is a front view of the front- and rear-wheel drive vehicle shown in FIG. 1 as viewed from the front of the vehicle; and FIG. 3 is a right side view showing a front half of the front- and rear-wheel drive vehicle shown in FIG. 1. In these figures, in relation to the front- and rear-wheel drive vehicle 10, a forward side of the vehicle is denoted by symbol Fw and a rearward (backward) side of the vehicle is denoted by symbol Bw. Also, the left side and right side as viewed by a driver riding the front- and rear-wheel drive vehicle 10 are denoted by symbols L and R, respectively.

[Front- and Rear-Wheel Drive Vehicle]

The front- and rear-wheel drive vehicle 10 shown in FIGS. 1 to 3 is, for example, a scooter-type motorcycle, in which a front wheel 11 is provided in lower front part of a vehicle body and a rear wheel 12 is provided in lower rear part of the vehicle body. The front wheel 11, which is steered by turning a handle 13 via a steering mechanism 14 and link-type suspension system 15 (or bottom arm-type suspension system), functions as a steered wheel. The link-type suspension system 15 is provided with a motor 16 adapted to drive the driving wheel, and the front wheel 11 also functions as a driving wheel.

The rear wheel 12, which is a non-steered wheel, is driven by a non-illustrated engine mounted on a vehicle body of the front- and rear-wheel drive vehicle 10. Thus, the rear wheel 12 also functions as a driving wheel.

Thus, the front- and rear-wheel drive vehicle 10 of the present embodiment is a front- and rear-wheel drive two-wheeler, in which the steered wheel is the motor-driven front wheel 11, the non-steered wheel is the engine-driven rear wheel 12, and the motor-driven front wheel 11 assists the engine-driven rear wheel 12. Driving parts of the vehicle include the engine and motor 16 while suspension parts of the vehicle include link-type suspension systems 15 and 18 and a shock absorber 55.

The front- and rear-wheel drive vehicle 10 configured as described above provides stable traveling performance even on snow-covered or wet road surfaces thanks to excellent traction performance resulting from use of the front and rear wheels as driving wheels and improves road ability. Furthermore, a hybrid drive by use of the motor 16 and engine enables both excellent acceleration performance and mileage at the same time.

A non-illustrated engine is mounted on the vehicle body of the front- and rear-wheel drive vehicle 10 shown in FIG. 1, and driving force of the engine is transmitted to a wheel axle of the rear wheel 12 via a power transmission system (also not illustrated).

A swing arm 17 is swingably supported via a non-illustrated frame pivot located at a bottom center of the vehicle body of the front- and rear-wheel drive vehicle 10. The swing arm 17 makes up a link-type suspension system 18 (or bottom arm-type suspension system) adapted to rotatably support the rear wheel 12 by a rear end portion of the swing arm 17. Note that the swing arm 17 may be made up of a unit swing engine equipped integrally with an engine and power transmission system by installing the engine on upper front part of the arm.

A cowling 20 serving as a front cover is installed in front part of the front- and rear-wheel drive vehicle 10, and a wind screen 21 is installed in upper part of the cowling 20, extending in an upper rear direction. On a rearward side of the cowling 20, a leg shield 22, a body side cover 23, and a rear cover 24 cover the vehicle body in sequence, making up a vehicle body cover covering the entire vehicle body. A seat 25 is installed above the body side cover 23 and rear cover 24.

Furthermore, upper part of the front wheel 11, which is a steered wheel, is covered with a front fender 27, and a head lamp 28 is installed above the front fender 27. Left and right blinkers 29 are installed in lower part on both sides of the head lamp 28.

Upper part of the non-steered, rear wheel 12 is covered with a rear fender 31, and a tail lamp 32 is installed above the rear fender 31.

Note that in FIG. 1, reference numeral 35 denotes a center stand and reference numeral 36 denotes a side stand. Reference numeral 37 denotes a rider foot rest and reference numeral 38 denotes pillion foot rest.

[Vehicle Front Structure]

Figure 4:
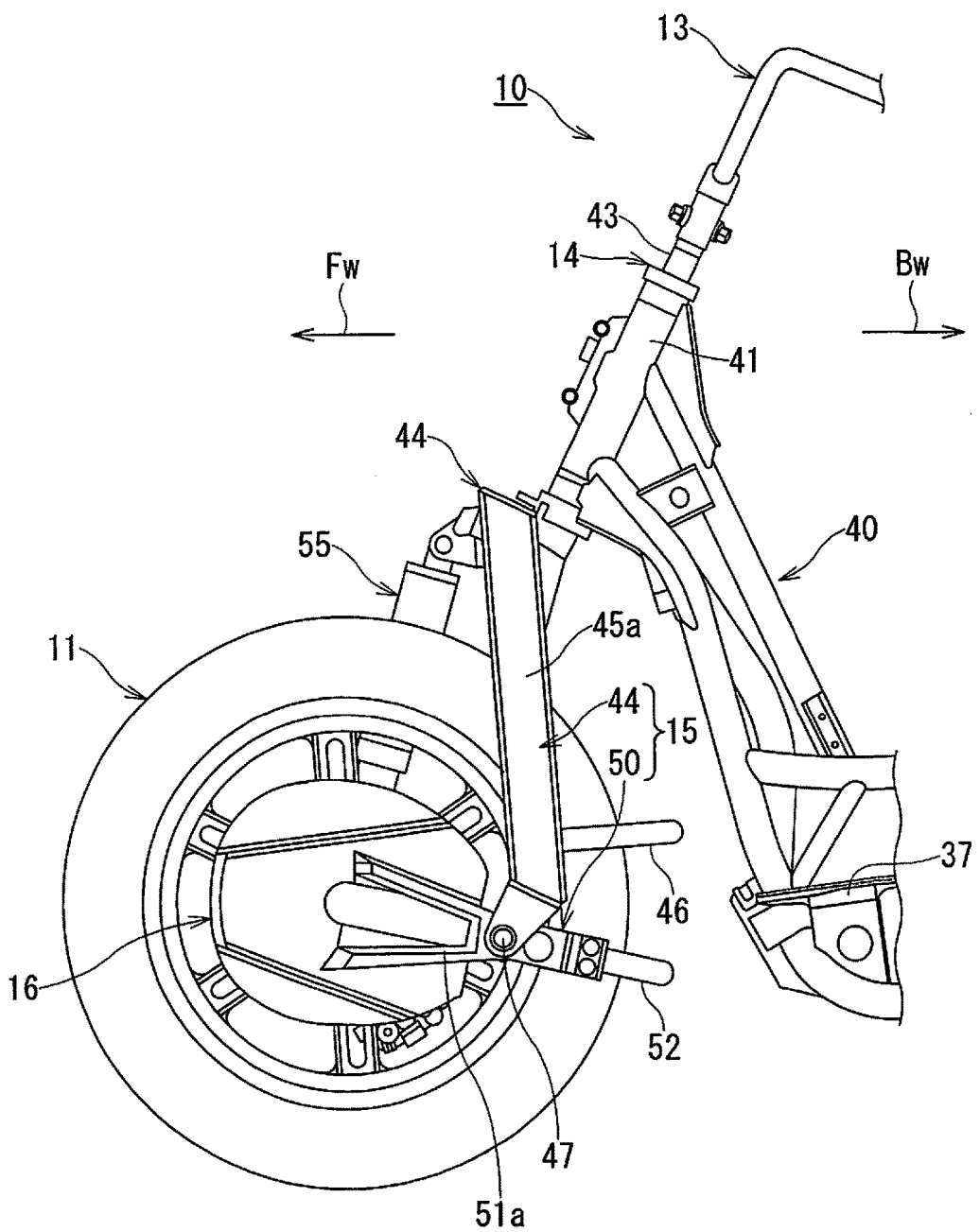
FIG. 4 is a left side view showing a vehicle body frame structure in the front half of the front- and rear-wheel drive vehicle.
Figure 5:
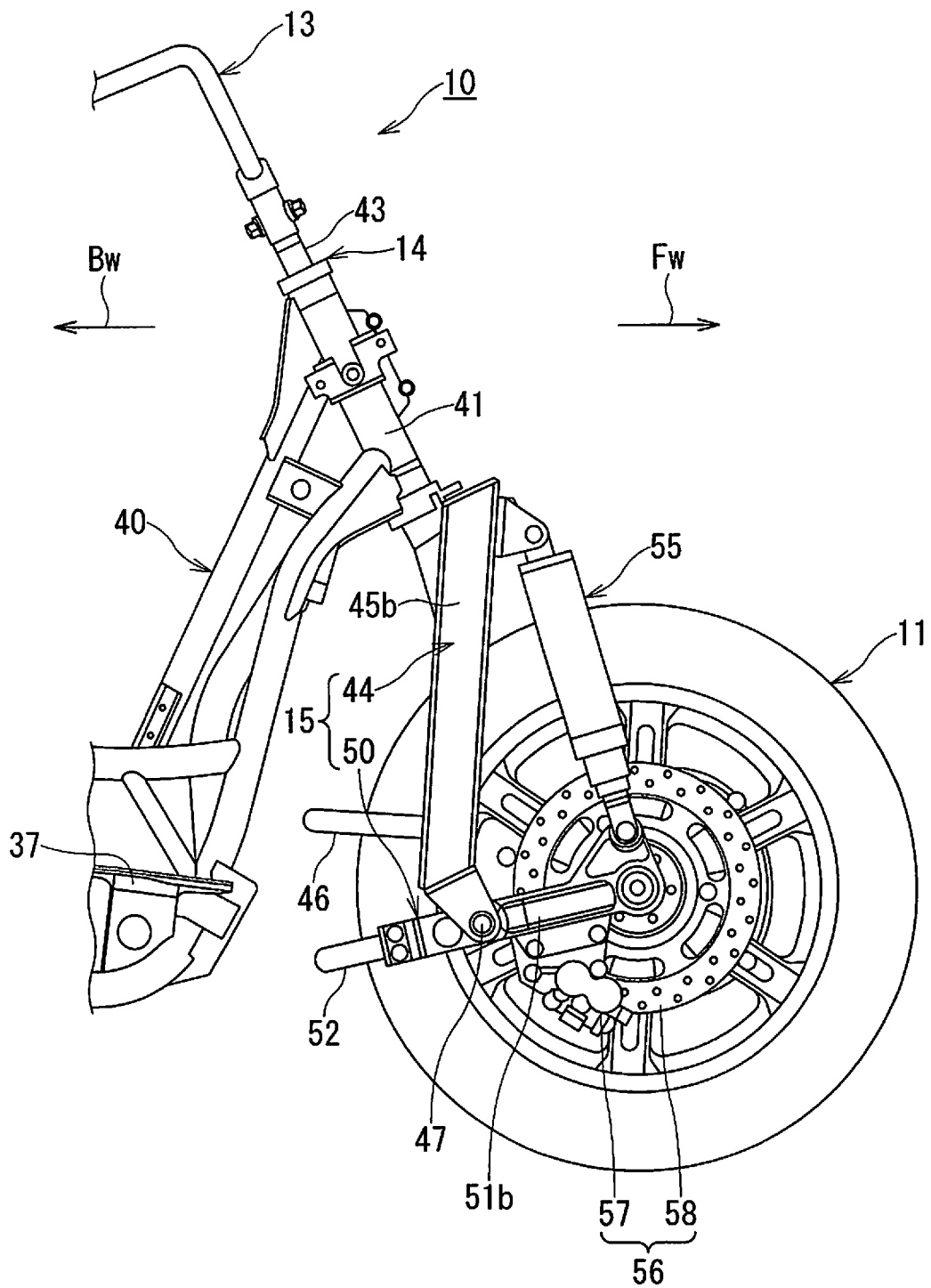
FIG. 5 is a right side view showing the vehicle body frame structure in the front half of the front- and rear-wheel drive vehicle.

The front part of the front- and rear-wheel drive vehicle 10 is constructed as shown in FIGS. 4 and 5. In the front- and rear-wheel drive vehicle 10, a head pipe 41 is installed on a front end portion of a body frame 40 having a down frame structure. A steering shaft 43 making up the steering mechanism 14 is rotatably installed in the head pipe 41 and a top of the steering shaft 43 is coupled to the handle 13. The steering mechanism 14 rotatably supports the steering shaft 43 in the head pipe 41. Lower part of the steering shaft 43 is coupled with the front fork 44 in lower part of the head pipe 41.

The front fork 44 branches into left and right fork legs 45a and 45b, which extend downward, straddling rear part of the front wheel 11. The left and right fork legs 45a and 45b of the front fork 44 are each made up of a rodlike member, and are not provided with a telescopic suspension mechanism. Lower parts of the left and right fork legs 45a and 45b are bend in a forward direction of the vehicle, pivots 47 are installed in lower end portions of the left and right fork legs 45a and 45b, and left and right arm portions 51a and 51b of a swing arm 50 are swingably supported by a pair of the left and right pivots 47. The arm portions 51a and 51b support the front wheel 11, which is the steered wheel. In this way, the link-type suspension system 15 makes up a bottom link-type or bottom arm-type support mechanism of the front wheel 11.

[Link-Type Suspension System of Front Wheel]

In a link-type suspension system 15 of the front wheel 11, the front fork 44 is installed on a vehicle body side by being fixed to lower part of the steering mechanism 14 of the front- and rear-wheel drive vehicle 10.

The front fork 44 is bifurcated into left and right branches and a pair of the left and right fork legs 45a and 45b are fixed to the left and right branches. Lower parts of the fork legs 45a and 45b are reinforced by being coupled together integrally via a substantially U-shaped bridge frame 46, which straddles and thereby detours the rear part of the front wheel 11 to improve mechanical and physical strength and maintain sufficient rigidity.

Furthermore, in the link-type suspension system 15 of the steered wheel, the arm portions 51$a$ and 51$b$ of the swing arm 50 extend from the pivots 47 serving as pivotal fulcrums toward a forward side of the vehicle along both sides of the vehicle, and the front wheel 11 is supported by front end portions of the arm portions 51$a$ and 51$b$.

The left and right arm portions 51$a$ and 51$b$ of the swing arm 50 are coupled integrally and thereby reinforced by a substantially U-shaped bridge frame 52, whose rear end portion straddles and thereby detours the rear part of the front wheel 11. The motor 16 is mounted as shown in FIG. 4 on the front end portion of one of the left and right arm portions, e.g., the left arm portion 51$a$. Another arm portion, i.e., the right arm portion 51$b$, of the swing arm 50 supports a wheel axle of the front wheel 11 as shown in FIG. 5.

Figure 7:
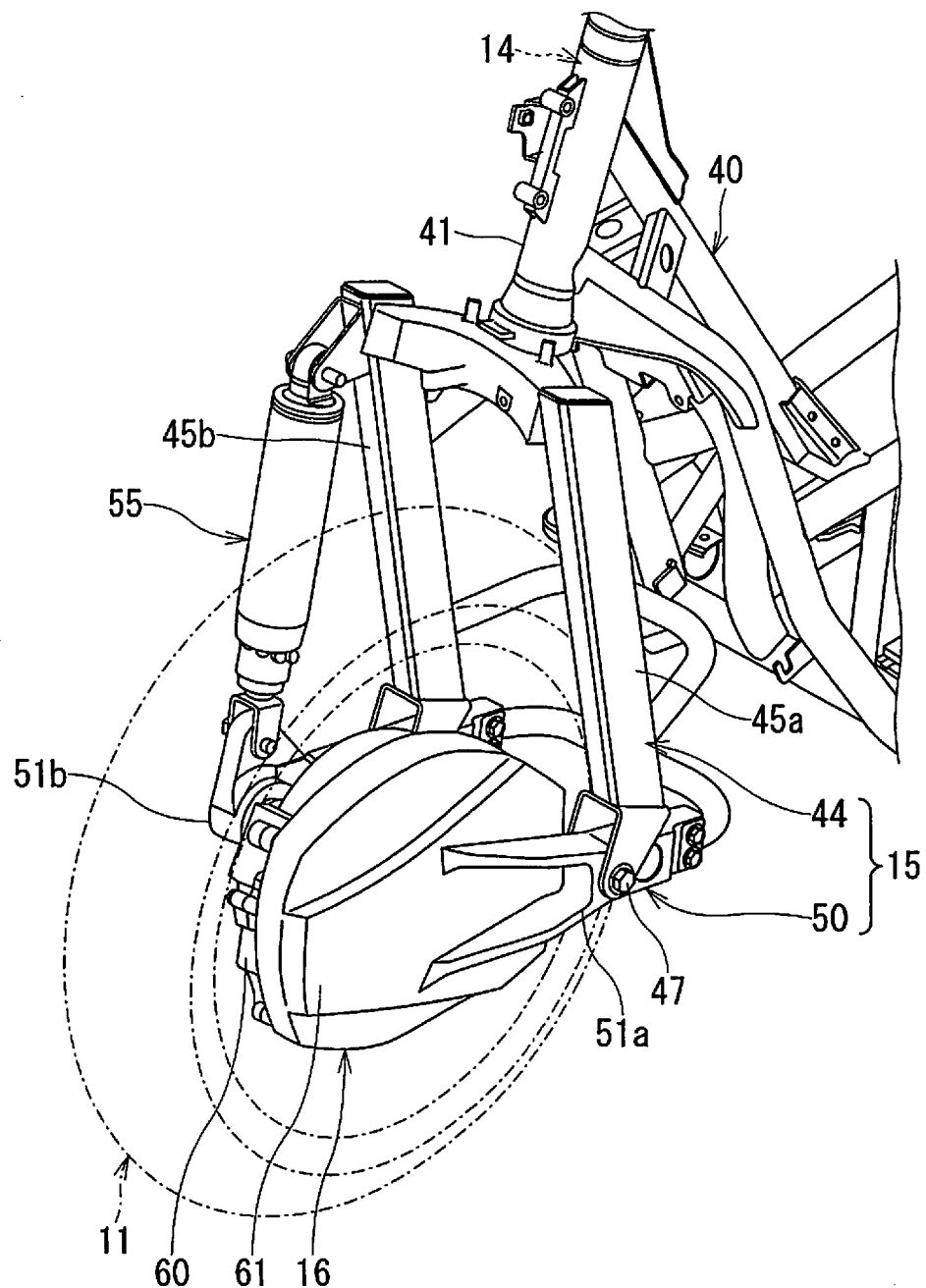
FIG. 7 is a perspective view of the vehicle body frame structure in the front half of the front- and rear-wheel drive vehicle as viewed from a left front side of the vehicle.

Here, the pair of left and right fork legs 45$a$ and 45$b$ of the front fork 44 are made up of rodlike members and placed outward of an outer edge of the motor 16, i.e., on a rearward (Bw side) of the vehicle, as shown in FIGS. 4 and 7 when the vehicle is viewed laterally. The front fork 44 needs high rigidity, and as the left and right fork legs 45$a$ and 45$b$ are installed outward of the outer edge of the motor 16, the left and right fork legs 45$a$ and 45$b$ can be increased in thickness and rigidity thereof can be improved easily without being affected by size, shape, and layout of the motor 16. Also, if width of the left and right fork legs 45$a$ and 45$b$ in the vehicle width direction is made smaller than width of a conventional telescopic front fork in the vehicle width direction, operability can be improved while keeping the width of the front fork 44 in the vehicle width direction compact at the same time.

In the swing arm 50, as shown in FIGS. 3 to 5 and 7 to 9, bearing points i.e., the pivots 47, of the left and right arm portions 51$a$ and 51$b$ on the side of the front fork 44, are placed outward of the outer edge of the motor 16, i.e., on the rearward side (Bw side) of the vehicle. In this way, instead of directly supporting the wheel axle of the front wheel 11, the front fork 44 is placed by being offset from a rotation axis of the front wheel 11 to the rearward side of the vehicle and the pivots 47 serving as a pivot shaft of the swing arm 50 are placed being spaced away from the motor 16. Thus, the front wheel 11 is not supported directly in lower part of a telescopic front fork as is conventionally the case, and even if the motor 16 is upsized, the wheel axle of the front wheel 11 can be kept from being increased in width.

Furthermore, the swing arm 50 is placed such that the pivots 47 will be placed inward of the outer edge of the front wheel 11 in a radial direction of the front wheel when the vehicle is viewed laterally. Consequently, while the fork legs 45$a$ and 45$b$ of the front fork 44 avoid the motor 16, the pivots 47 are placed close to the wheel axle of the front wheel 11. Thus, even when the front shock absorber 55 is placed by being offset only to one of the left and right sides (e.g., right side) of the front wheel 11 on a side opposite to the motor 16, torsion of the swing arm 50 can be minimized and stability in supporting the front wheel 11 can be improved.

Furthermore, since the front fork 44 is disposed so as to extend in a vertical direction by being spaced away from the wheel axle of the front wheel 11 to the rearward side (Bw side) of the vehicle when viewed in a lateral direction of the vehicle, weight of the front fork 44 which needs rigidity can be shifted toward a center side in a front-back direction of the vehicle body, thereby improving operability.

[Front Shock Absorber and Braking Device]

A mounting bracket is installed, near the wheel axle, in an upper tip portion of one of the left and right arm portions (e.g., the right arm portion 51$b$) of the swing arm 50 and the front shock absorber 55 is mounted between the mounting bracket and a mounting bracket in upper front part of the right fork leg 45$b$ of the front fork 44.

Furthermore, the motor 16 is installed on a left side of the front wheel 11 and a braking device 56 is installed on a right side. The braking device 56 includes a brake caliper 57 attached to the right arm portion 51$b$ of the swing arm 50, a brake disc 58 attached to a right wheel hub of the front wheel 11, and a brake pad 59 installed on the brake caliper 57. The braking device 56 performs braking as the brake pad 59 pinches the brake disc 58.

Here, the front- and rear-wheel drive vehicle 10 of the present embodiment uses the link-type suspension system 15 to suspend the steered, front wheel 11. Adoption of this structure eliminates the need to install a telescopic fork leg equipped with a shock-absorbing mechanism on both left and right sides as with the conventional telescopic front fork and enables use of a suspension mechanism in which the front shock absorber 55 is placed only, for example, on the right arm portion 51$b$ of the swing arm 50. As shown in FIGS. 6 to 9, the motor 16 heavy in weight is installed on one of the left and right sides of the front wheel 11 (i.e., left and right sides of a steering axis Sc of the steering shaft 43), e.g., on the left side (L side) of the front wheel 11 while the front shock absorber 55 and braking device 56 (lighter in weight than the motor 16) are installed on an opposite side, i.e., on the right side (R side) of the front wheel 11. Since the front shock absorber 55 and braking device 56 are both mounted on one of the left and right arm portions 51$a$ and 51$b$ of the swing arm 50 and the motor 16 is mounted on the other, it is easy to maintain proper weight balance between left and right around the steering shaft 43 of the vehicle.

The front fork 44 is installed rearward to the motor 16 and front shock absorber 55 in longitudinal direction of the vehicle and thus the pair of left and right fork legs 45$a$ and 45$b$ of the front fork 44 do not straddle the motor 16 or front shock absorber 55. This makes it possible to reduce width of the front fork 44 in the vehicle width direction compared to the conventional telescopic front fork.

Furthermore, with the structure in which the front shock absorber 55 can be placed only on one side of the swing arm 50, e.g., the right arm portion 51$b$, as shown in FIGS. 6 to 9, even if the motor 16 is installed in the left arm portion 51$a$, the front shock absorber 55 can be placed easily in the right arm portion 51$b$ without interfering with the motor 16.

Besides, since no front shock absorber is installed in the left arm portion 51$a$, there are few constraints on the layout and size of the motor 16 and design freedom of motor parts as well as freedom in placement of the motor 16 can be improved further.

Compared to a structure, such as the conventional telescopic front fork, in which the motor is sandwiched by suspension mechanisms on left and right sides, when the front wheel 11 is supported by the left and right arm portions 51$a$ and 51$b$ of the swing arm 50 with a narrow width, width of the link-type suspension system 15 in the vehicle width direction can be reduced. Consequently, inertia around the steering axis Sc in steering the handle 13 can be kept low, improving operability.

In this way, by mounting the single front shock absorber 55 on the right arm portion 51$b$ of the swing arm 50 in terms of a mounting location on the side of the wheel axle of the front wheel, it is possible to improve freedom of installation and easily optimize layout around the wheel axle of the front wheel.

For example, as shown in FIGS. 4 and 5, when viewed in the lateral direction of the vehicle, the mounting location of the single front shock absorber 55 in the another arm portion, e.g., in the right arm portion 51*b*, is provided inward of the outer edge of the motor 16. As the front shock absorber 55 is placed with its mounting location overlapping with the motor 16, the motor 16 heavy in weight, the front shock absorber 55, and the like are concentrated near the wheel axle of the front wheel, making it possible to improve operability by reducing inertia during steering.

In addition, if the front shock absorber 55 is placed with its mounting location being spaced away slightly from the wheel axle of the front wheel, the front shock absorber 55 can be mounted easily by avoiding an occupied area of the motor 16 in the vehicle width direction, making it possible to reduce the width in the vehicle width direction, and thus in a front wheel axle direction of the front wheel. Furthermore, as the mounting location on the side of the wheel axle is established at a low location, stroke length of the shock absorber 55 can be secured sufficiently, resulting in excellent shock absorbency and improved vehicle body stability and comfort.

Figure 6:
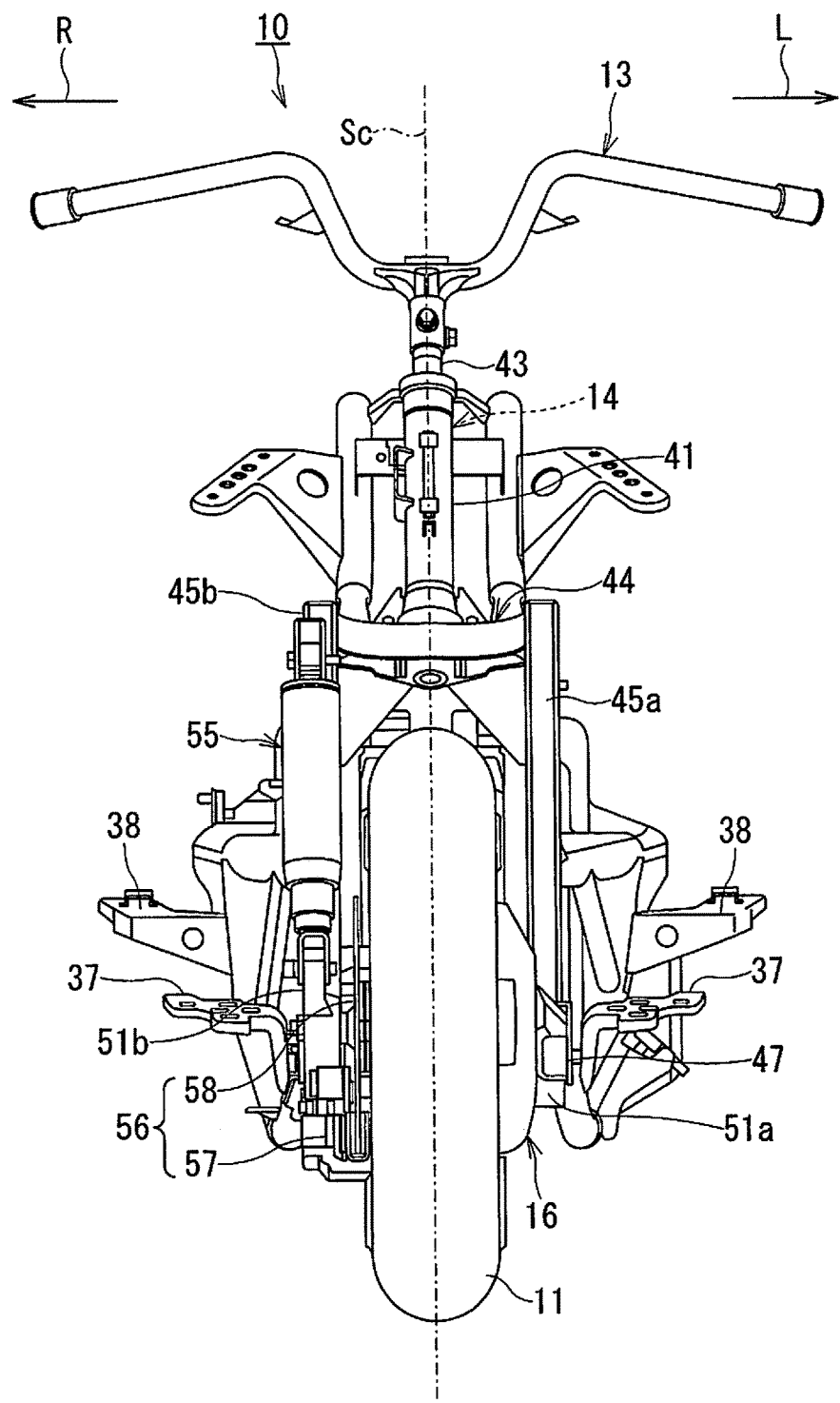
FIG. 6 is a front view of the vehicle body frame structure of the front- and rear-wheel drive vehicle as viewed from the front of the vehicle.

The braking device 56 is placed together with the single shock absorber 55 on a side opposite to the motor 16, i.e., on the right side of the front wheel 11. Consequently, as shown in FIG. 6, on opposite sides of the steering axis Sc, as the motor 16 and a motor support structure are placed on the left side of the front wheel 11 while the braking device 56 as well as the single shock absorber 55 are placed on the right side of the front wheel 11, proper weight balance can be maintained between the left and right sides of the vehicle with the motor 16 heavy in weight being placed on one side.

In addition, since the motor 16 and the braking device 56 are placed on different sides—left and right sides—of the front wheel 11, even if outside diameter of the motor 16 is increased, there are few constraints on installation of the braking device 56 and freedom of installation of both the motor 16 and braking device 56 can be improved.

Note that although the braking device 56 is made up of the brake caliper 57, brake disc 58, and brake pad 59 in the above example, the braking device 56 may be made up of a brake drum, brake shoe, and the like.

[Motor Mounting Structure]

Figure 8:
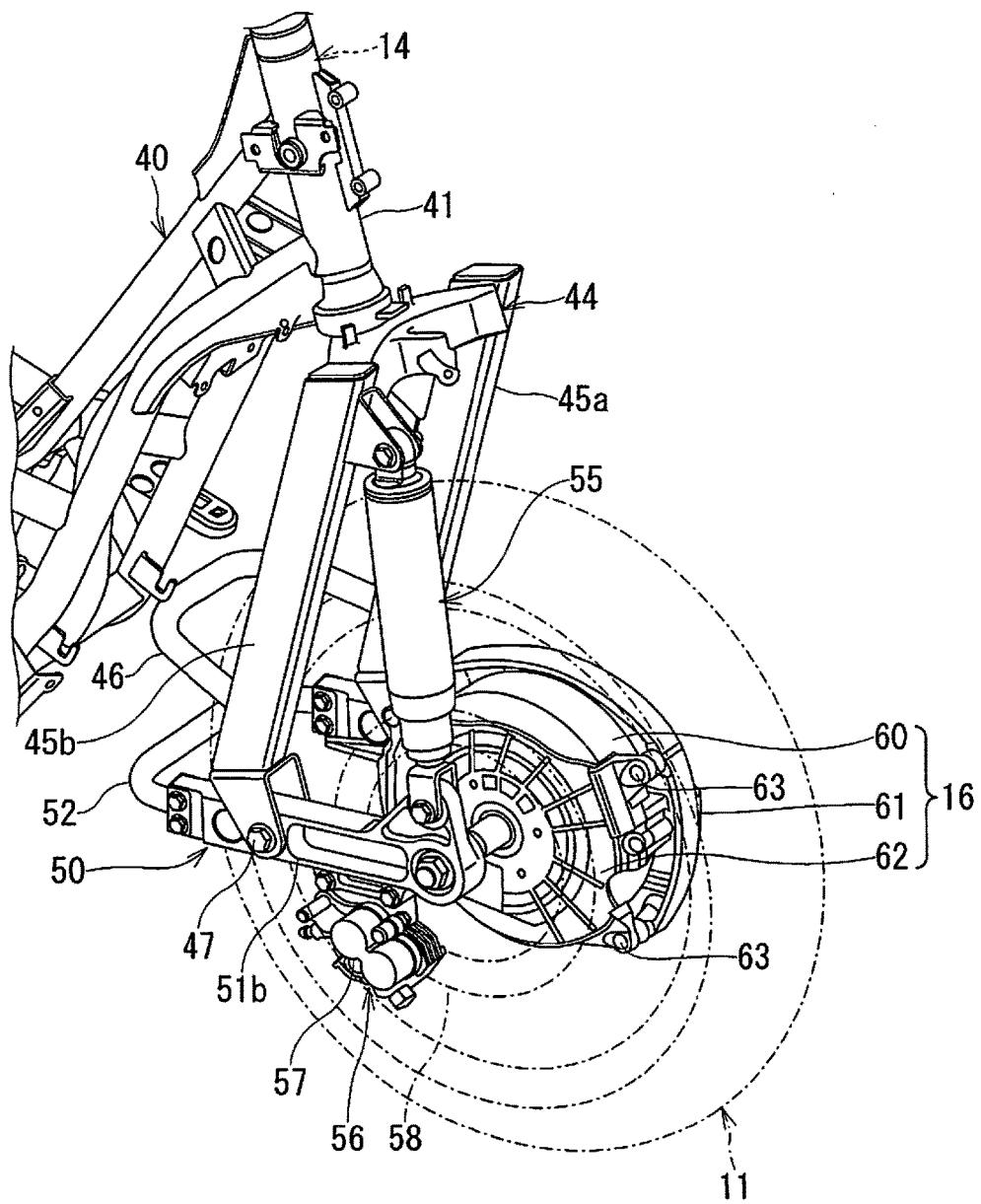
FIG. 8 is a perspective view of the vehicle body frame structure in the front half of the front- and rear-wheel drive vehicle as viewed from a right front side of the vehicle.
Figure 9:
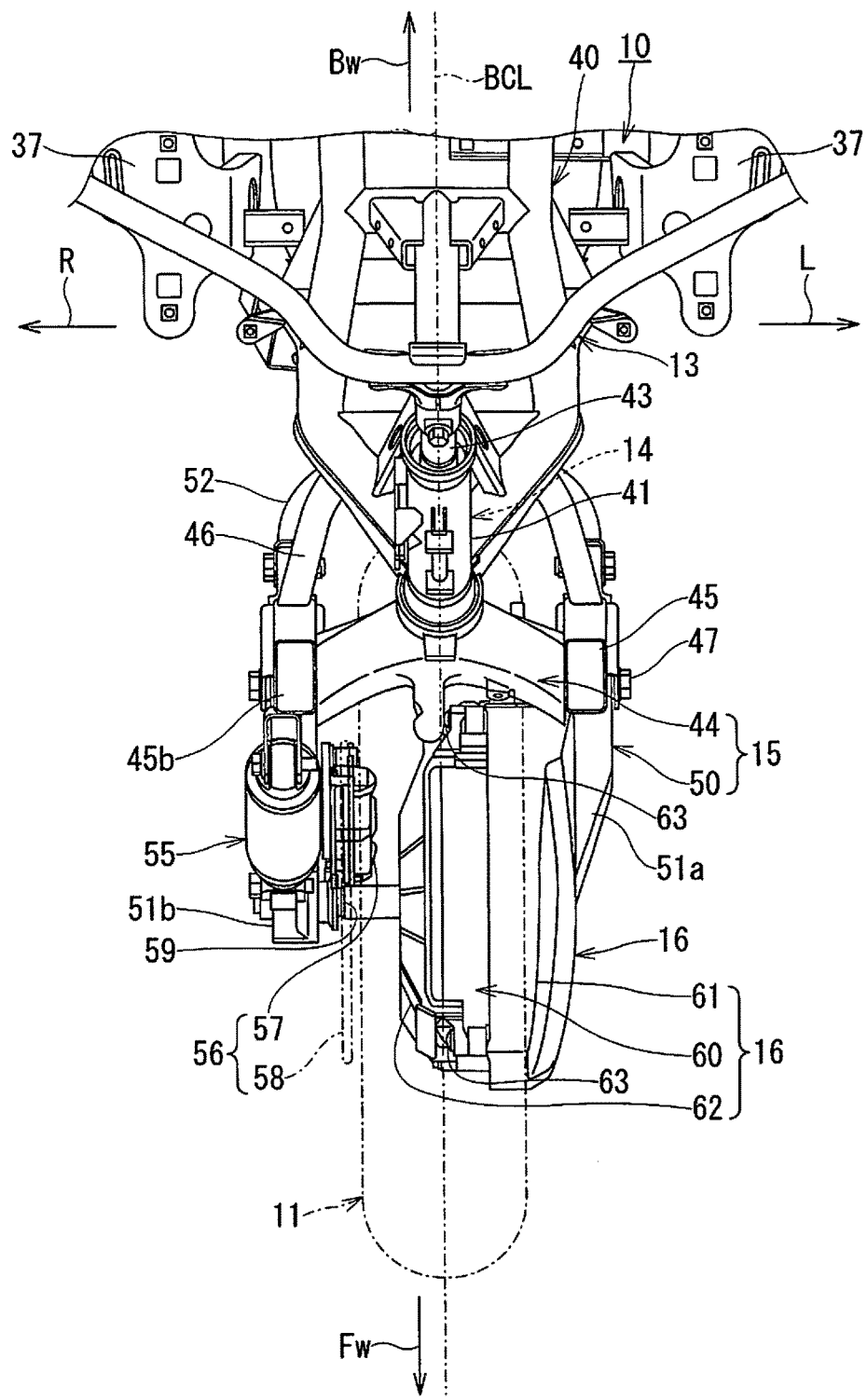
FIG. 9 is a plan view of the vehicle body frame structure in the front half of the front- and rear-wheel drive vehicle as viewed from above the vehicle.

As shown in FIGS. 7 to 9, the motor 16 adapted to drive the front wheel 11 is installed on the swing arm 50 of the link-type suspension system 15 provided in lower part of the steering mechanism 14. The motor 16 is mounted on one of the left and right arm portions, e.g., the left arm portion 51*a*, of the swing arm 50. Of the motor 16 mounted on the left arm portion 51*a*, a motor body 60 is covered with a motor cover 61 from outside the vehicle when viewed from a side of the vehicle. The motor cover 61 is integrally fixed to a front end portion of the left arm portion 51*a* of the link-type suspension system 15 and fixed to the vehicle body side via the swing arm 50 and front fork 44.

The motor 16 includes the motor body 60, the motor cover 61, and an inner cover 62, where the inner cover 62 is integrated into the motor 16 by being fastened to the motor cover 61 using plural motor mounting bolts, with the motor body 60 placed inside. The motor 16 is installed on one of the left and right sides, e.g., on the left side, of the steered, front wheel 11.

[Motor Structure]

Figure 10:
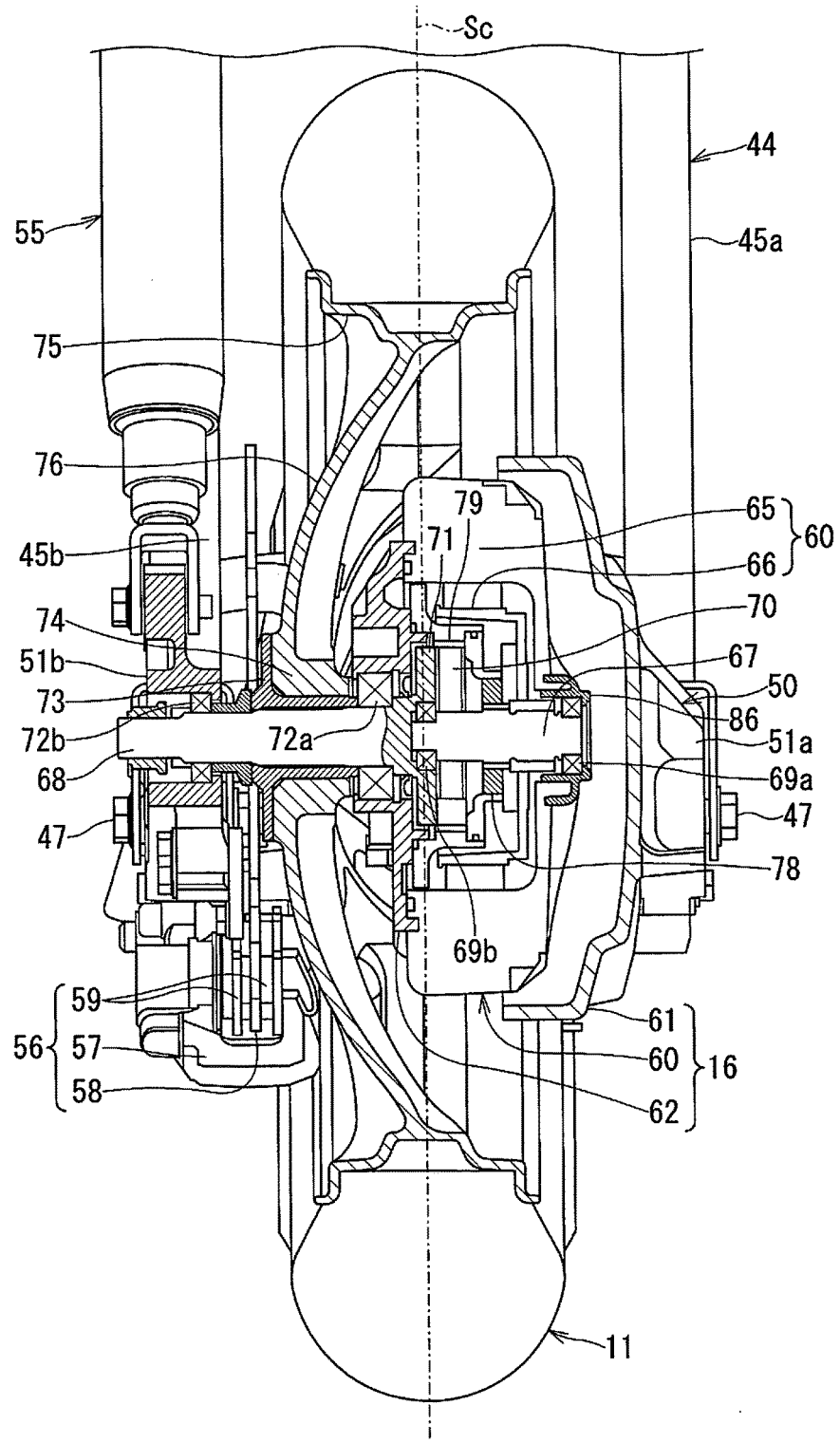
FIG. 10 is a sectional view showing a support structure for a front wheel and motor, where the front wheel is a steered wheel of the front- and rear-wheel drive vehicle.
Figure 11:
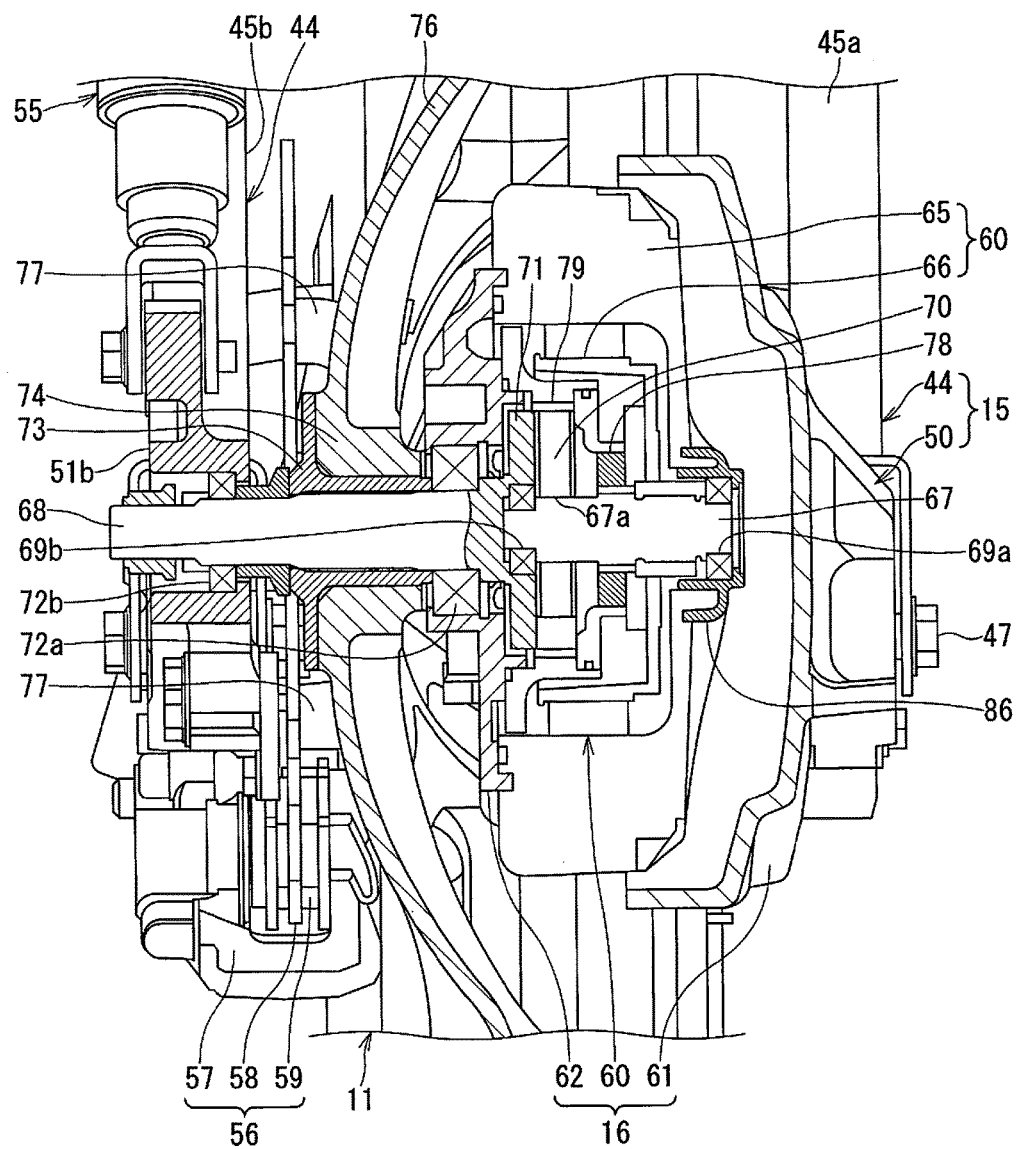
FIG. 11 is an enlarged sectional view showing a cross sectional structure of the motor shown in FIG. 10.

The swing arm 50 is swingably supported in lower part of the link-type suspension system 15 of the steered wheel, and the motor 16 installed in one of the arm portions, e.g., in the left arm portion 51*a*, of the swing arm 50 is configured as shown in FIGS. 10 and 11. The motor body 60 housed in the motor cover 61 includes a stator 65 fixed to the motor body 60 and a rotor 66 supported by the motor body 60 by facing the stator 65 in such a way as to be able to rotate relative to the stator 65, where the rotor 66 is installed on a motor (inner) shaft 67 in such a way as to be able to rotate integrally with the motor shaft 67. The motor shaft 67 is installed side by side with the wheel axle 68 of the front wheel 11 in an axial direction so as to form a common shaft.

The motor shaft 67 configured to be able to rotate integrally with the rotor 66 is rotatably supported on opposite sides in an axial direction by bearings 69*a* and 69*b*. The motor shaft 67 of the motor 16 has a sun gear portion and meshes with a planetary gear 70. The planetary gear 70 meshes with a ring gear 79 provided on an outer side of the planetary gear 70 and configured to be stationary. Being installed integrally with a motor-side end portion of the wheel axle 68, a planetary gear carrier 71 rotatably holds the planetary gear 70 and rotates coaxially with the motor shaft 67 along with rotary motion of the planetary gear 70 around the motor shaft 67. The wheel axle 68 is also rotatably supported on both sides in an axial direction by bearings 72*a* and 72*b*, and the wheel axle 68 and motor shaft 67 are adapted to rotate relatively via the bearing 69*b*.

Then, a rotational driving force of the rotor 66 generated as the motor 16 operates is transmitted from the motor shaft 67 to the wheel axle 68 with its speed reduced by the planetary gear 70, and then transmitted to a wheel hub 74 via a power transmission member 73 to drive the front wheel 11. The rotor 66 is operated, for example, to assist the engine.

As shown in FIGS. 10 and 11, a wheel spoke 76 linking a wheel rim 75 and wheel hub 74 of the front wheel 11 is curved, for example, into an arc shape as a whole, and the motor 16 is installed in a curved recess of the wheel spoke 76. A boss 77 is formed on the wheel spoke 76 or wheel hub 74, projecting laterally outward from the front wheel 11, and a brake disc 58 is mounted on the projecting boss 77 and fixed thereto. Note that reference numeral 78 denotes an oil seal.

[Link-Type Suspension System for Rear Wheel]

In the front- and rear-wheel drive vehicle 10 of the present embodiment, the rear wheel 12, which is a non-steered wheel, functions as a driving wheel driven by the engine as shown in FIG. 1. The rear wheel 12 is swingably suspended and supported by a bottom arm-type suspension system or the link-type suspension system 18. The link-type suspension system 18 includes the swing arm 17 swingably supported around frame pivots (not illustrated) in lower center part of the vehicle body of the front- and rear-wheel drive vehicle 10. The swing arm 17 extends to the rearward side of the vehicle and branches halfway into left and right arm portions to support the rear wheel 12 in rear end portions of the left and right arm portions.

In the front- and rear-wheel drive vehicle 10, the non-illustrated engine is suspended by the body frame located under the seat 25. The driving force of the engine is transmitted to the rear wheel 12 via a power transmission system such as a chain mechanism or belt mechanism to drive the rear wheel 12. Note that the engine may be installed in upper front part of the swing arm 17. When the engine is installed on the swing arm 17, the driving force of the engine is transmitted to the rear wheel 12 via the power transmission system of a stepless change mechanism and reduction gear mechanism. The swing arm 17 is made up of a unit swing engine.

A single rear shock absorber (not illustrated) is installed between one of the left and right arm portions of the swing arm 17 and the body frame 40.

Furthermore, in the front- and rear-wheel drive vehicle 10 of the present embodiment, the rear wheel 12 may be configured to be motor-driven rather than being engine-driven. When the rear wheel 12 is configured to be motor-driven, for example, the motor is installed on one of the arm portions of the swing arm 17 and a single rear shock absorber is installed between another arm portion and the vehicle body. As shown in FIG. 9, the motor is installed such that center of gravity of the motor is located on one of the left and right sides, e.g., on the left side, of a vehicle body center line BCL in the vehicle width direction, and the single rear shock absorber and the braking device are installed on an opposite side, i.e., on the right side.

[Drive Control System for Front- and Rear-Wheel Drive Vehicle]

In the front- and rear-wheel drive vehicle 10, a driving source of the front wheel 11 is the motor 16 and a driving source of the rear wheel 12 is an engine. In the front- and rear-wheel drive vehicle 10, for example, as shown in FIG. 1, motor output and engine power are controlled by a drive control system 80 mounted under the seat 25 or under a rear end portion of a seat rail on the vehicle body.

Figure 12:
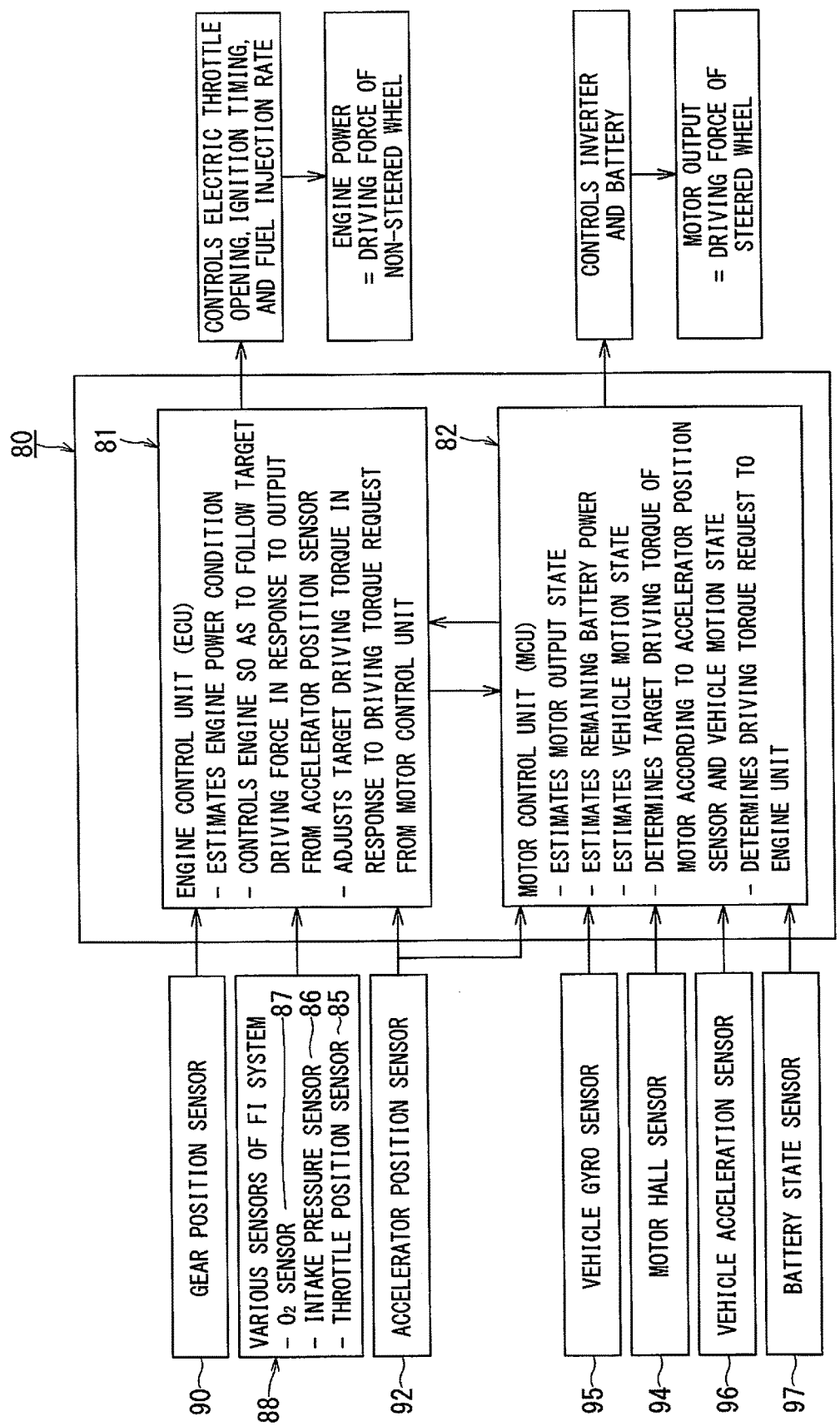
FIG. 12 is a block diagram showing a drive control system provided on the front- and rear-wheel drive vehicle.

As shown in FIG. 12, the drive control system 80 includes an engine control unit (hereinafter referred to as an ECU) 81 and a motor control unit (hereinafter referred to as a MCU) 82, where the ECU 81 includes at least a processor and memory circuitry and controls the engine power by controlling engine ignition timing, fuel injection rate, injection duration, and the like while the MCU 82 includes at least a processor and memory circuitry and controls the motor output. The front- and rear-wheel drive vehicle 10 includes an electric throttle valve and a fuel injection (FI) system, and controls the engine, motor, and the like using the ECU 81. The ECU 81 and MCU 82 serving as the core of the drive control system 80 are made up of a computer, and the drive control system 80 is provided with increased vibration, water, and weather resistance to be adapted to use in the front- and rear-wheel drive vehicle with an internal board being covered with resin.

As various sensors 88 of a fuel injection system in various parts of the vehicle body, the front- and rear-wheel drive vehicle 10 is provided with a throttle position sensor 85 adapted to measure a throttle valve opening, an intake pressure sensor 86 adapted to measure intake air quantity, an $O_2$ sensor 87 adapted to measure $O_2$ density in exhaust gas, and other sensors. Furthermore, the vehicle, if equipped with a transmission mechanism, includes a gear position sensor 90 adapted to measure a gear coefficient, an accelerator position sensor 92 adapted to measure an amount of accelerator operation carried out by the driver as well as a motor hall sensor 94 adapted to detect rotor position of the motor, a vehicle gyro sensor 95 which is an angular velocity sensor of the vehicle body, a vehicle acceleration sensor 96 adapted to measure acceleration of the vehicle body, a battery state sensor 97 adapted to measure remaining battery power, and so on.

Of these sensors, sensor signals from the various sensors 88 of the fuel injection system, gear position sensor 90, and accelerator position sensor 92 are inputted to the ECU 81. The ECU 81 estimates an engine power condition based on sensor information from the sensors, and performs engine power control by maintaining optimal throttle valve opening, ignition timing, and fuel injection rate in order to reach target driving torque in response to output from the accelerator position sensor. Consequently, the target driving torque of the rear wheel 12 is controlled.

Sensor information from the accelerator position sensor 92, motor hall sensor 94, vehicle gyro sensor 95, vehicle acceleration sensor 96, and battery state sensor 97 is inputted to the MCU 82. Based on the sensor information, the MCU 82 estimates motor output state and remaining battery power and estimates vehicle motion state including an inclination angle (banking angle) of the vehicle. Then, using the output from the accelerator position sensor and estimation results on the vehicle motion state, the MCU 82 determines the target driving torque of the motor 16 according to the vehicle motion state, and then controls an inverter and battery (neither is illustrated) based on the motor target driving torque. Consequently, target driving torque of the front wheel 11 is controlled.

The MCU 82 and ECU 81 perform operation control in coordination with each other. The MCU 82 determines driving torque requirements for the engine based on the motor target driving torque and informs the ECU 81 of the driving torque requirements. Using the driving torque requirements for the engine, the ECU 81 adjusts the target driving torque of the engine and controls the engine power.

The MCU 82 can determine a range of the motor target driving torque based on an increment of the engine target driving torque set by the ECU 81. In this case, the ECU 81 determines the engine target driving torque for the accelerator opening, estimates an increment of rear wheel target driving torque at this time, and informs the MCU 82 of the estimate. Based on the provided increment of the rear wheel target driving torque, the MCU 82 controls the motor target driving torque such that the front wheel target driving torque will fall, for example, within a range to be sufficiently small compared to the increment.

[Outline of Vehicle Drive Control]

As described earlier, with the front- and rear-wheel drive vehicle 10, if the driver carries out an acceleration operation while turning the vehicle by tilting the vehicle body (hereinafter referred to as cornering), moment opposite a steering direction acts due to an increasing driving force of the front wheel 11, which may give the driver a sense of discomfort, but the drive control system 80 of the present embodiment solves this problem by appropriate performing adjustment control over the target driving torque of the front wheel 11 (and rear wheel 12) in response to the acceleration operation carried out by the driver.

In the front- and rear-wheel drive vehicle 10 of the present embodiment, the MCU 82 of the drive control system 80 estimates a banking angle α of the vehicle based on sensor information from the vehicle gyro sensor 95 and vehicle acceleration sensor 96, and if the driver carries out an acceleration operation during cornering by opening the throttle, the MCU 82 performs control to decrease the target driving torque of the front wheel 11 compared to when similar acceleration operation is carried out during upright running.

In the front- and rear-wheel drive vehicle 10 of the present embodiment, the MCU 82 of the drive control system 80 performs control of increasing a decrease width of the target driving torque in response to the acceleration operation carried out by the driver along with increases in the banking angle of the vehicle.

Through the motor target driving torque control performed by the MCU 82 of the drive control system 80 in this way, it is possible to lessen influence of increases in the driving force of the front wheel 11 on steering behavior when the driving force increases in response to an acceleration operation carried out by the driver during cornering, and ease the sense of discomfort given to the driver, allowing the driver to handle the vehicle in a manner close to a normal rear-wheel drive two-wheeler.

Also, since the motor target driving torque in response to an acceleration operation is varied between banking state and upright running state of the vehicle, it is possible in the upright running state to reduce behavioral changes of the handle 13 during cornering and thus achieve stable running while displaying an acceleration force by utilizing good responsiveness of the motor 16 and controllability of low-speed torque.

Furthermore, by coordinating the driving forces of the front and rear wheels with each other, the drive control system 80 performs control such that a sufficient driving force will be obtained from the rear wheel 12 even if increases in the driving force of the front wheel 11 are limited. When the MCU 82 of the drive control system 80 decreases the front wheel target driving torque by controlling the motor target driving torque, the ECU 81 increases the rear wheel target driving torque by increasing the engine target driving torque. Meanwhile, the ECU 81 performs control to increases the rear wheel target driving torque based on the limit placed on the front wheel target driving torque under control of the MCU 82. For example, the rear wheel target driving torque is increased without exceeding the limit on the front wheel target driving torque.

Consequently, since drive control is performed such that the driving force of the rear wheel 12 will increase by the amount corresponding to the amount increasing in the driving force of the front wheel 11 which are limited during banking of the vehicle, a sufficient acceleration force can be obtained as in the case when the vehicle is running upright.

In the drive control system 80, the ECU 81 limits the rear wheel target driving torque by determining the engine target driving torque for the accelerator opening in response to acceleration operation during banking of the vehicle while the MCU 82 performs control of reducing the motor target driving torque based on the increment of the rear wheel target driving torque such that the front wheel target driving torque will fall within a range to be sufficiently small compared to the increment of the rear wheel target driving torque. This makes it possible to increase accuracy of control performed to allocate driving forces between the front and rear wheels, without installing an additional sensor on the side of the engine and thereby increase an amount of assist given to the front wheel by the motor.

With the drive control system 80 of the front- and rear-wheel drive vehicle 10 according to the present embodiment, even when the vehicle is running upright, if the remaining battery power for driving the motor is lower than a fixed level, the MCU 82 performs control of decreasing the front wheel target driving torque in order to charge the battery by reducing power consumption. The ECU 81 is informed of the limit on motor output by the MCU 82 and performs control to increase the rear wheel target driving torque without exceeding the limit.

In this way, when the remaining battery power is low, the drive control system 80 reduces the output of the motor 16 and thus power consumption, and increases engine speed and thus engine power, thereby charging the battery and making it easy to keep the driving force of the entire vehicle at a desired level.

[Handling Characteristics of Front Wheel Drive]

Description will be given regarding what effects the above-mentioned control brings about and how the control is performed concretely. With the front- and rear-wheel drive vehicle 10 as shown in FIG. 13A, when the vehicle is banking during cornering, a tire tread Td of the steered, front wheel 11 shifts to an inner side (IN side) of a steering axis Sc in the turning direction. Therefore, due to running resistance Rr which acts in a direction opposite to a traveling direction on the tire tread Td when the throttle is opened in the case of a normal rear-wheel drive vehicle, moment around the steering axis Sc acts on a steering handle in an Mi direction, producing a force tending to rotate inward in the turning direction.

However, when a driving force D is given to the front wheel and the driving force D overcomes the running resistance Rr, moment M around the steering axis Sc acts in an opposite direction (Mo direction) and a force tending to rotate outward (OUT side) in the turning direction is produced on the steering handle. Note that reference character G denotes a front center of gravity of the front- and rear-wheel drive vehicle while reference character T denotes a trail point of the steering axis Sc. Reference character l denotes a width direction distance between the steering axis Sc and front tire tread Td.

In the case of a normal rear-wheel drive vehicle, even if the driver accelerates by opening the accelerator when the vehicle is banking, a direction of force does not change and only the running resistance increases or decreases. In the case of a front-wheel drive, if the driver keeps accelerating by opening the accelerator in a banked turn, when the driving force D which overcomes the running resistance Rr applied to the tire tread Td occurs as shown in FIG. 13B, direction of the steering torque needed for handling changes. With the vehicle on which the driving force D is added to the steered wheel, because moment M={distance l×(driving force D−running resistance Rr)} around the steering axis Sc acts in the Mo direction in FIG. 13B, the steering handle changes its behavior by being subjected to a force tending to rotate outward in the turning direction.

Consequently, whereas with the vehicle on which the driving force D is added to the front wheel 11, changes in the steering behavior occur in a banked turn depending on magnitude of changes in the driving force D in response to the running resistance Rr. With the front- and rear-wheel drive vehicle 10 according to the present embodiment, as described above, when the vehicle is banking, the MCU 82 of the drive control system 80 controls the moment M applied to the steering axis Sc in the Mo direction by the driving force D by decreasing the front wheel target driving torque compared to when the vehicle is running upright. Thus, influence on the steering behavior is mitigated and good turning performance is obtained in much the same way as the conventional rear-wheel drive vehicle.

[Flow of Vehicle Drive Control]

Figures 14A, 14B:
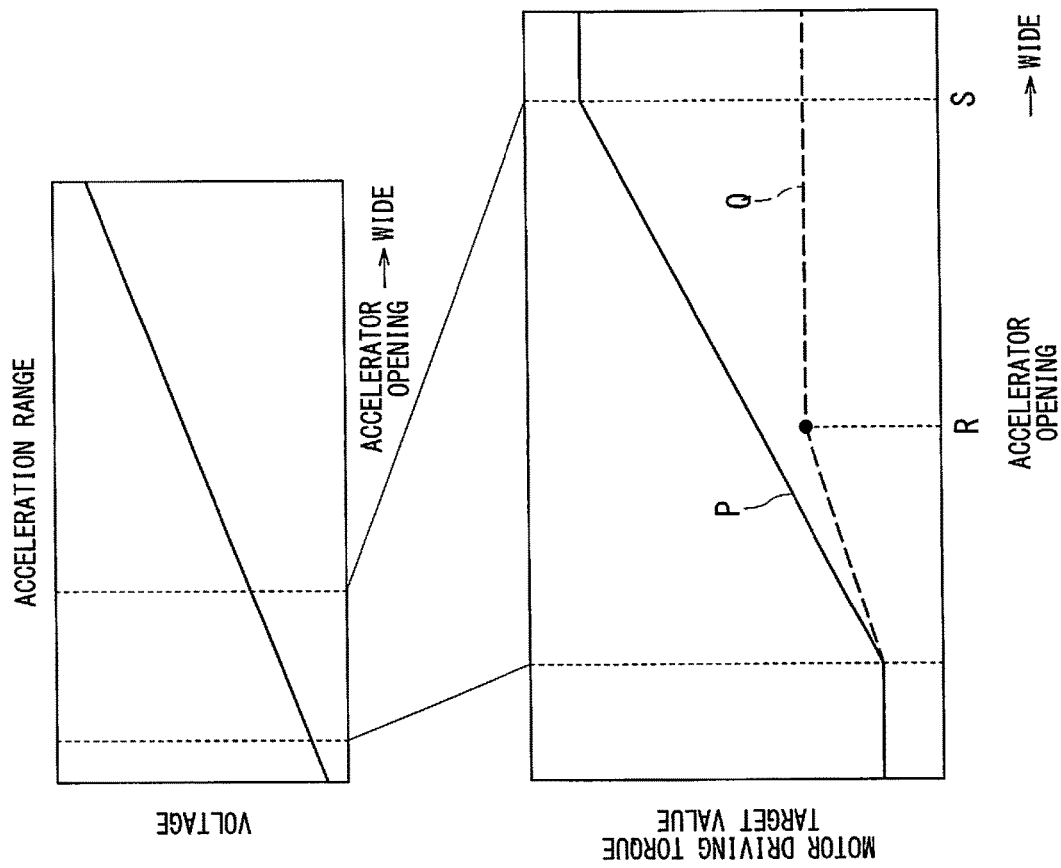
FIG. 14A is a map showing a relationship between an accelerator opening of the front- and rear-wheel drive vehicle and a signal output voltage.
FIG. 14B is a map showing a relationship between an accelerator opening and a motor target driving torque value as well as showing an exemplary driving torque command signal issued to a motor adapted to drive the steered wheel.

FIG. 14 illustrates, by example, an output map used for target driving torque command control over the motor 16 when the front wheel 11 is motor-driven, where FIG. 14A is a map showing a relationship between an accelerator opening detected by the accelerator position sensor 92 and an output voltage serving as target driving torque command signal while FIG. 14B is a map showing a relationship between an accelerator opening in a predetermined range and a motor target driving torque value.

In FIG. 14B, the solid line P indicates a relationship of the motor target driving torque value with the accelerator opening in upright running state. The dashed line Q indicates a relationship of the motor target driving torque value with the accelerator opening at a predetermined banking angle. When the vehicle is running upright, the driving torque target value of the motor 16 is set to increase linearly with increases in the accelerator opening as indicated by the solid line P, and become constant when the accelerator opening goes beyond a predetermined position S. When the vehicle is banking, the target driving torque value is set smaller than the target driving torque value at the same accelerator opening in upright running state as indicated by the dashed line Q and a decrease width increases with increases in the accelerator opening. Moreover, when the accelerator opening goes beyond a predetermined position R (smaller than S), the target driving torque value becomes constant. Incidentally, regarding the target driving torque value in a banked turn, settings similar to the above-mentioned dashed line Q have been made at any banking angle α, and the decrease width of the target driving torque value (solid line P) in upright running state increases with increases in the banking angle α.

In this way, if the motor target driving torque value corresponding to an acceleration operation carried out by the driver in a banked turn is kept down compared to the value in upright running state, thereby decreasing the front wheel target driving torque, it is possible to reduce changes in the steering behavior and improve stability of the vehicle body.

Figure 15:
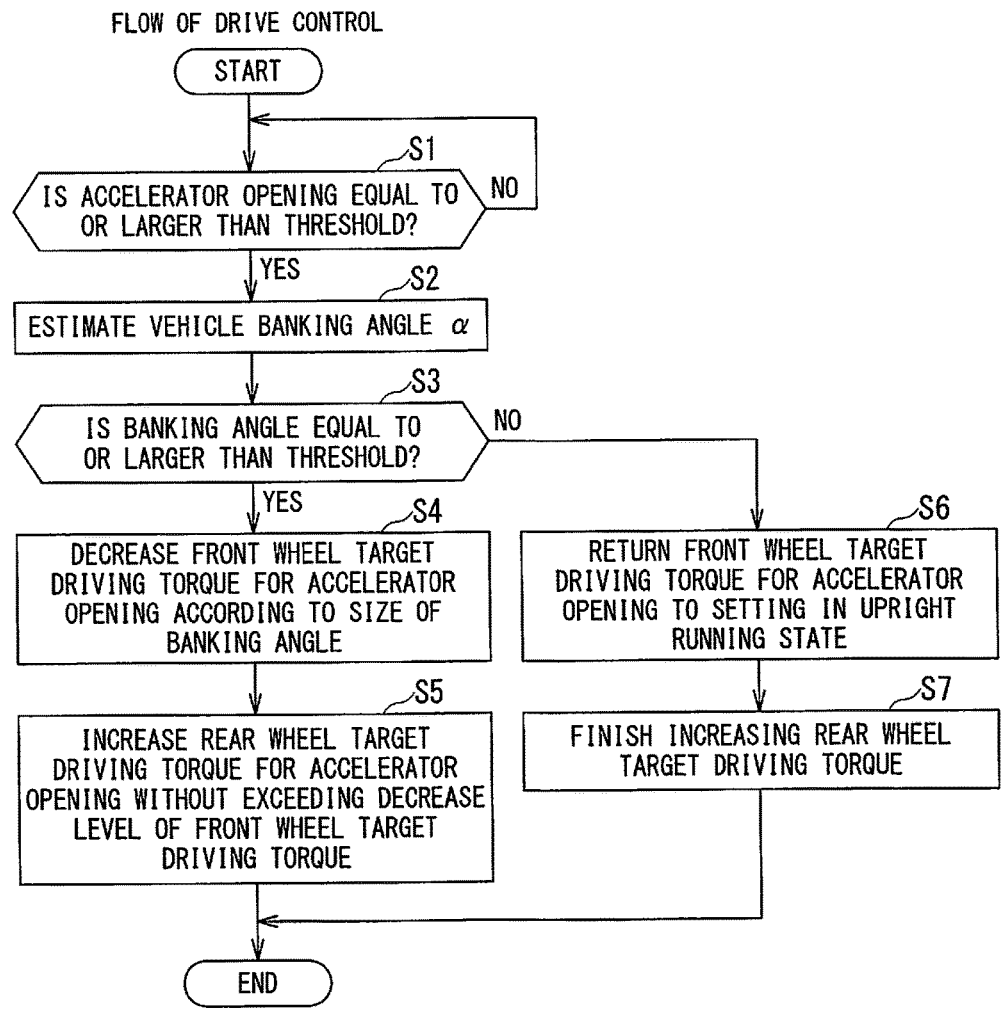
FIG. 15 is a flowchart showing a flow of drive control performed by a drive control system for the front- and rear-wheel drive vehicle during cornering.

According to the embodiment of the present invention, in a flow of drive control over the front wheel 11 and rear wheel 12 performed by the drive control system 80, as shown in FIG. 15, first, it is determined in step 1 (S1) whether or not the accelerator opening resulting from an acceleration operation of the driver is equal to or larger than a predetermined threshold. When the accelerator opening is smaller than the predetermined threshold (No), the drive control system 80 returns to step 1 (S1).

When the accelerator opening is equal to or larger than the predetermined threshold (Yes), the drive control system 80 goes to step 2 (S2). Here, based on sensor signals from the vehicle gyro sensor 95 and vehicle acceleration sensor 96, the MCU 82 estimates the banking angle α of the vehicle.

Next, in step 3 (S3), the drive control system 80 determines whether the estimated banking angle α of vehicle exceeds a predetermined angle. When the banking angle α of the vehicle exceeds the predetermined angle (Yes), the drive control system 80 goes to step 4 (S4) by considering that the vehicle is banking.

In step 4 (S4), the drive control system 80 performs control of decreasing the motor target driving torque value for the accelerator opening compared to the value in upright running state (changing the target driving torque from a state of the solid line P to a state of the dashed line Q in the graph of FIG. 14B) and thereby decreasing the front wheel target driving torque. Here, the decrease width of the motor target driving torque value is controlled to increase with increases in the banking angle α of the vehicle.

In step 5 (S5), based on a decrease level of the motor target driving torque set by the MCU 82, the drive control system 80 determines driving torque requirements for the engine and sends the driving torque requirements to the ECU 81. Then, using the driving torque requirements for the engine, the ECU 81 adjusts the engine target driving torque for the accelerator opening toward increasing the target driving torque and performs control of increasing the rear wheel target driving torque. Here, the MCU 82 determines the engine driving torque requirements such that the increment of the rear wheel target driving torque will fall within a range not exceeding a decrease level of the front wheel target driving torque.

On the other hand, when it is determined in step 3 (S3) that the banking angle α of the vehicle does not exceed the predetermined angle (No), the drive control system 80 goes to step 7 (S7) by considering that the vehicle is running upright.

In step 6 (S6), contrary to step 4 (S4), the drive control system 80 returns the motor target driving torque value for the accelerator opening to the value in upright running state (state of the solid line P in the graph of FIG. 14B) (or maintains the target driving torque value of upright running state) and controls the front wheel target driving torque.

In step 7 (S7), the drive control system 80 finishes the control of increasing the engine target driving torque value for the accelerator opening and finishes increasing the rear wheel target driving torque.

In this way, when the vehicle is banking, the drive control system 80 performs control of decreasing the front wheel target driving torque for the accelerator opening according to size of the banking angle α. Consequently, even if the driver carries out an acceleration operation in a banked turn, action of moment acting on the steering handle in a direction opposite to a turning direction due to the driving force of the front wheel 11 can be reduced. This makes it possible to mitigate influence such as changes in steering behavior and thereby achieve good turning performance.

Also, when the front wheel target driving torque is decreased, control of increasing the rear wheel target driving torque is performed to make up for the decrement. This provides a powerful driving force to the vehicle while improving turning performance during cornering. Increases and decreases in the driving force of the entire front and rear wheels are reduced, enabling smooth acceleration without a sense of discomfort.

Furthermore, a computational processing unit 101 of the ECU 81 adjusts the driving force of the rear wheel without exceeding an amount of adjustment of the driving force of the front wheel. This provides just enough driving force close to original vehicle driving force in the same way as when the vehicle is running upright, even during cornering.

Furthermore, although not illustrated, if the driver performs an acceleration operation when the vehicle is banking, the drive control system 80 may determine the range of the motor target driving torque based on the increment of the engine target driving torque. In this case, the ECU 81 determines the engine target driving torque for the accelerator opening, estimates an increment of the rear wheel target driving torque at this time, and informs the MCU 82 of the estimate. Based on the provided increment of the rear wheel target driving torque, the MCU 82 performs control of decreasing the motor target driving torque such that the front wheel target driving torque will fall within a predetermined range to be sufficiently small compared to the increment. If this control step is provided, for example, between step 3 (S3) and step 4 (S4) of the drive control flow of FIG. 15, the control of decreasing the motor target driving torque can be performed effectively.

In this way, since the ECU 81 controls the rear wheel target driving torque by determining the engine target driving torque and allows the MCU 82 to perform control of decreasing the motor target driving torque using the obtained information about the increment of the rear wheel target driving torque, it is possible to increase the accuracy of control performed to allocate driving forces between the front and rear wheels, without installing an additional sensor on the side of the engine and thereby increase the amount of assist given to the front wheel by the motor.

With the front- and rear-wheel drive vehicle 10 according to the present embodiment, the motor 16 adapted to drive the front wheel 11 uses a battery as a power source. A state of remaining power of the battery is measured by the battery state sensor 97. Information about the measured remaining battery power is sent to the MCU 82 of the drive control system 80.

Figure 16:
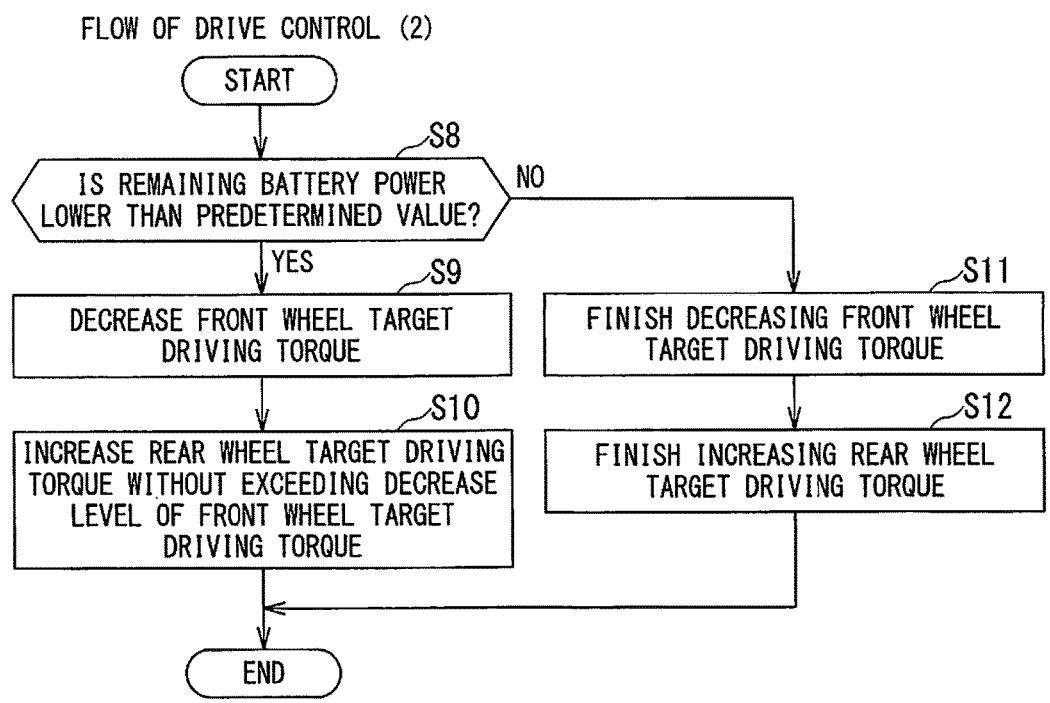
FIG. 16 is a flowchart showing a flow of drive control performed by a drive control system for the front- and rear-wheel drive vehicle when remaining battery power for driving a motor falls to or below a predetermined value.

The drive control system 80 performs drive control of the front wheel 11 and rear wheel 12 according to the remaining battery power. As shown in FIG. 16, in flow (2) of the drive control, based on information about the measured remaining battery power, the MCU 82 determines in step 8 (S8) whether or not remaining battery power C is lower than a predetermined value.

When the remaining battery power C is lower than the predetermined value (Yes), the drive control system 80 goes to step 9 (S9) and performs control of decreasing the front wheel target driving torque. Meanwhile, the MCU 82 performs control of decreasing the motor target driving torque by a predetermined level and thereby decreasing the front wheel target driving torque.

Next, in step 10 (S10), based on a decrease level of the motor target driving torque set by the MCU 82, the drive control system 80 determines driving torque requirements for the engine and sends the driving torque requirements to the ECU 81. Then, using the driving torque requirements for the engine, the ECU 81 adjusts the engine target driving torque toward increasing the target driving torque and performs control of increasing the rear wheel target driving torque. Here, the MCU 82 determines the engine driving torque requirements such that an increment of the rear wheel target driving torque will fall within a range not exceeding the decrease level of the front wheel target driving torque.

On the other hand, when it is determined in step 8 (S8) that the remaining battery power C is not lower than the predetermined value (No), the drive control system 80 goes to step 11 (S11), finishes the control of reducing the motor target driving torque value contrary to step 9 (S9), and finishes decreasing the front wheel target driving torque.

In step 12 (S12), the drive control system 80 finishes the control of increasing the engine target driving torque value and finishes increasing the rear wheel target driving torque.

In this way, when the remaining battery power C of the motor drive battery is lower than the predetermined value, the drive control system 80 performs the control of increasing the engine target driving torque in such a way as to decrease the motor target driving torque, limit the driving force of the front wheel 11, and increase the driving force of the rear wheel 12 without exceeding the limit in order to charge the battery by reducing power consumption. Consequently, the driving force of the entire vehicle can be maintained constant while charging the battery. Note that the above-mentioned drive control based on the state of remaining battery power can be performed regardless of whether the vehicle is banking or running upright.

Although in the example described in the embodiment of the present invention, the front- and rear-wheel drive vehicle is a motorcycle which has one front wheel and one rear wheel, as long as the vehicle is structured to bank during cornering with the steered wheel becoming tilted, the present invention is applicable to other types of saddle-type vehicle including a three-wheeled motorcycle having one front wheel and two rear wheels.

Although in the front- and rear-wheel drive vehicle described by way of example in the embodiment of the present invention, the driving source of the steered wheel is a motor and the driving source of the non-steered wheel is an engine, the driving source of the non-steered wheel may also be a motor.

Whereas an embodiment of the present invention has been described above, the embodiment is presented only by way of example, and not intended to limit the scope of the invention. Such novel embodiments can be implemented in various other forms, and various omissions, replacements, and changes can be made without departing from the spirit of the invention. Such embodiments and modifications thereof are included in the spirit and scope of the invention as well as in the invention set forth in the appended claims and the scope of equivalents thereof. For example, regarding the configuration of the drive control system, although in the example described in the embodiment of the present invention, the ECU and MCU are constructed integrally and caused to share functions within the system, the ECU and MCU may be constructed separately. Such internal construction of the drive control system and sharing of individual functions may be modified as appropriate without departing from the spirit of the present invention.

What is claimed is:

1. A drive control system for a front- and rear-wheel drive vehicle, the drive control system being installed on the front- and rear-wheel drive vehicle, which is a two-wheeler equipped with a front wheel and a rear wheel both serving as driving wheels, one of which is a steered wheel, wherein when the vehicle is banking, the drive control system performs control of decreasing, compared to when the vehicle is running upright, target driving torque of the steered wheel according to an amount of accelerator operation during acceleration operation of a driver.

2. The drive control system for a front- and rear-wheel drive vehicle according to claim 1, wherein the drive control system performs control of increasing a decrease width of the target driving torque of the steered wheel with increase in a banking angle of the vehicle.

3. The drive control system for a front- and rear-wheel drive vehicle according to claim 1, wherein when the drive control system performs control of decreasing the target driving torque of the steered wheel, the drive control system performs control of increasing target driving torque of a non-steered wheel.

4. The drive control system for a front- and rear-wheel drive vehicle according to claim 3, wherein the drive control system performs control of increasing the target driving torque of the non-steered wheel based on a decrease amount of the target driving torque of the steered wheel.

5. The drive control system for a front- and rear-wheel drive vehicle according to claim 3, wherein the drive control system performs control of setting an upper limit of increase amount in the target driving torque of the non-steered wheel equal to the decrease amount of the target driving torque of the steered wheel.

6. The drive control system for a front- and rear-wheel drive vehicle according to claim 1, wherein the drive control system estimates an increase amount of the target driving torque of a non-steered wheel based on the acceleration operation of the driver and performs control of decreasing the target driving torque of the steered wheel such that the target driving torque of the steered wheel will fall within a predetermined range smaller than the estimated increase amount of the target driving torque of the non-steered wheel.

7. The drive control system for a front- and rear-wheel drive vehicle according to claim 1, wherein: the front- and rear-wheel drive vehicle includes a motor adapted to give a driving force to the steered wheel and an engine adapted to give a driving force to a non-steered wheel; and when the drive control system performs control of decreasing the target driving torque of the steered wheel, the drive control system performs control of increasing the target driving torque of the non-steered wheel.

8. The drive control system for a front- and rear-wheel drive vehicle according to claim 7, wherein the drive control system detects remaining battery power of a battery serving as a driving source for the motor, and when the remaining battery power is lower than a predetermined value, the drive control system performs control of decreasing the target driving torque of the steered wheel driven by the motor.

9. A drive control method performed by a drive control system for a front- and rear-wheel drive vehicle equipped with a front wheel and a rear wheel both serving as driving wheels, one of which is a steered wheel, the method comprising:
   when the vehicle is banking, the drive control system performing control of decreasing, compared to when the vehicle is running upright, target driving torque of the steered wheel during acceleration operation of the driver.

10. The drive control method for a front- and rear-wheel drive vehicle according to claim 9, wherein performing control of decreasing target driving torque of the steered wheel includes performing control of increasing a decrease width of the target driving torque of the steered wheel with increase in a banking angle of the vehicle.

11. The drive control method for a front- and rear-wheel drive vehicle according to claim 9, further comprising, when the control of decreasing the target driving torque of the steered wheel is performed, performing control of increasing target driving torque of a non-steered wheel.

12. The drive control method for a front- and rear-wheel drive vehicle according to claim 11, wherein performing control of increasing target driving torque of the non-steered wheel is performed based on a decrease amount of the target driving torque of the steered wheel.

13. The drive control method for a front- and rear-wheel drive vehicle according to claim 11, wherein performing control of increasing target driving torque of the non-steered wheel includes performing control of setting an upper limit of increase amount in the target driving torque of the non-steered wheel equal to the decrease amount of the target driving torque of the steered wheel.

14. The drive control method for a front- and rear-wheel drive vehicle according to claim 9, further comprising:
   estimating an increase amount of the target driving torque of a non-steered wheel based on the acceleration operation of the driver; and
   performing control of decreasing the target driving torque of the steered wheel such that the target driving torque of the steered wheel will fall within a predetermined range smaller than the estimated increase amount of the target driving torque of the non-steered wheel.

15. The drive control method for a front- and rear-wheel drive vehicle according to claim 9, wherein the front- and rear-wheel drive vehicle includes a motor adapted to give a driving force to the steered wheel and an engine adapted to give a driving force to a non-steered wheel, and the method further comprising when the control of decreasing the target driving torque of the steered wheel is performed, performing control of increasing target driving torque of the non-steered wheel.

16. The drive control method for a front- and rear-wheel drive vehicle according to claim 15, further comprising:
   detecting remaining battery power of a battery serving as a driving source for the motor; and
   when the remaining battery power is lower than a predetermined value, performing control of decreasing the target driving torque of the steered wheel driven by the motor.

* * * * *